United States Patent
Kanemura et al.

(10) Patent No.: US 11,922,690 B2
(45) Date of Patent: Mar. 5, 2024

(54) DATA PROCESSING SYSTEM AND DATA PROCESSING METHOD

(71) Applicant: SEMICONDUCTOR ENERGY LABORATORY CO., LTD., Atsugi (JP)

(72) Inventors: Takuro Kanemura, Hokkai-do (JP); Taisuke Higashi, Hiroshima (JP); Hiroya Hibino, Kanagawa (JP); Atsuya Tokinosu, Kanagawa (JP); Hiromichi Godo, Kanagawa (JP); Satoru Okamoto, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 24 days.

(21) Appl. No.: 17/619,623

(22) PCT Filed: Jun. 12, 2020

(86) PCT No.: PCT/IB2020/055509
§ 371 (c)(1),
(2) Date: Dec. 16, 2021

(87) PCT Pub. No.: WO2020/261028
PCT Pub. Date: Dec. 30, 2020

(65) Prior Publication Data
US 2022/0351509 A1    Nov. 3, 2022

(30) Foreign Application Priority Data
Jun. 25, 2019  (JP) .................................. 2019-117639

(51) Int. Cl.
*G06V 20/20* (2022.01)
*G06F 1/16* (2006.01)
(Continued)

(52) U.S. Cl.
CPC .............. *G06V 20/20* (2022.01); *G06F 1/163* (2013.01); *G06V 20/68* (2022.01); *G09B 5/02* (2013.01); *G06V 10/82* (2022.01); *G09B 19/003* (2013.01)

(58) Field of Classification Search
CPC ........ G06V 20/20; G06V 20/68; G06V 10/82; G06F 1/163; G06F 3/167; G06F 3/012;
(Continued)

(56) References Cited

U.S. PATENT DOCUMENTS

| 9,704,257 B1 | 7/2017 | Tuzel et al. |
| 2008/0200107 A1* | 8/2008 | Christensen ........... A22B 5/007 452/157 |

(Continued)

FOREIGN PATENT DOCUMENTS

| CN | 108416703 A | 8/2018 |
| EP | 3667264 A | 6/2020 |

(Continued)

OTHER PUBLICATIONS

International Search Report (Application No. PCT/IB2020/055509) dated Sep. 29, 2020.

(Continued)

*Primary Examiner* — Jitesh Patel
(74) *Attorney, Agent, or Firm* — Fish & Richardson P.C.

(57) ABSTRACT

A data processing system, a data processing device, and a data processing method are provided. The data processing system includes a wearable device including a display means and an imaging means and a database that is connected to the wearable device through a network. The database includes at least one of pieces of information on a cooking recipe, a cooking method, and a material. The wearable device detects a first material by the imaging means. The wearable device collects information on the first (Continued)

material from the database. When the first material exists in a specific region in an imaging range of the imaging means, the information on the first material is displayed on the display means. When the first material does not exist in the specific region, the information on the first material is not displayed on the display means.

9 Claims, 15 Drawing Sheets

(51) Int. Cl.
    *G06V 10/82*    (2022.01)
    *G06V 20/68*    (2022.01)
    *G09B 5/02*     (2006.01)
    *G09B 19/00*    (2006.01)

(58) Field of Classification Search
CPC ........ G06F 3/013; G06F 3/017; G06F 16/538; G06F 16/583; G06F 3/011; G06F 3/0482; G06F 3/16; G09B 5/02; G09B 19/003; G06Q 50/10
See application file for complete search history.

(56) References Cited

U.S. PATENT DOCUMENTS

| | | | |
|---|---|---|---|
| 2017/0068925 A1* | 3/2017 | Sudo | G06F 3/011 |
| 2017/0069090 A1 | 3/2017 | Okumura et al. | |
| 2017/0323449 A1* | 11/2017 | Aonuma | G06T 7/20 |
| 2018/0232202 A1 | 8/2018 | Tagawa et al. | |
| 2018/0310361 A1* | 10/2018 | Sorenson | F24C 15/105 |
| 2019/0251316 A1 | 8/2019 | Okumura et al. | |
| 2020/0357187 A1* | 11/2020 | Drouin | G06F 3/011 |
| 2020/0386609 A1 | 12/2020 | Sato | |
| 2021/0055790 A1* | 2/2021 | Suzuki | G06F 3/013 |
| 2021/0397252 A1* | 12/2021 | Nakade | G06F 3/04815 |

FOREIGN PATENT DOCUMENTS

| | | |
|---|---|---|
| JP | 2006-323590 A | 11/2006 |
| JP | 2011-058782 A | 3/2011 |
| JP | 2017-055177 A | 3/2017 |
| JP | 2017-120164 A | 7/2017 |
| JP | 2017-120329 A | 7/2017 |
| JP | 2018-124672 A | 8/2018 |
| JP | 2018-128979 A | 8/2018 |
| JP | 2018-535491 | 11/2018 |
| JP | 6692960 | 5/2020 |
| KR | 2019-0100496 A | 8/2019 |
| WO | WO-2019/031020 | 2/2019 |
| WO | WO-2020/245694 | 12/2020 |

OTHER PUBLICATIONS

Written Opinion (Application No. PCT/IB2020/055509) dated Sep. 29, 2020.
Redmon.J et al., "YOLOv3: An Incremental Improvement", arXiv:1804.02767, Apr. 8, 2018, pp. 1-6, Cornell University.
Badrinarayanan. V et al., "SegNet: A Deep Convolutional Encoder-Decoder Architecture for Image Segmentation", arXiv:1511.00561, Nov. 2, 2015, pp. 1-14, Cornell University.
Tomotaka Usui et al., "A Study on Estimating Eye Direction using Smart Eyewear", Multimedia, Distributed, Cooperative and Mobile(DICOMO2016) Symposium 2016, Jul. 6, 2016, pp. 1172-1174.

* cited by examiner

DATA PROCESSING SYSTEM AND DATA PROCESSING METHOD

CROSS REFERENCE TO RELATED APPLICATIONS

This application is a U.S. National Phase Application under 35 U.S.C. § 371 of International Application PCT/IB2020/055509, filed on Jun. 12, 2020, which is incorporated by reference and claims the benefit of a foreign priority application filed in Japan on Jun. 25, 2019 as Application No. 2019-117639.

TECHNICAL FIELD

One embodiment of the present invention relates to a data processing system, a data processing device, and a data processing method. One embodiment of the present invention also relates to a cooking assistance system, a cooking assistance device, and a cooking assistance method.

BACKGROUND ART

In recent years, cooking recipe introduction service through information terminals such as smartphones or tablets has been popular (Patent Document 1).

A user can cook while referring to a recipe by keeping an information terminal that displays the recipe on hand.

In addition, in recent years, a technique for detecting an object from an image using a neural network has been proposed.

The object detection is a technique for extracting a portion where an image of an object is presumed to be taken from images as a rectangle (a bounding box) and recognizing an object in the rectangle (Patent Document 2). As the object detection method, R-CNN (Regions with Convolutional Neural Networks), YOLO (You Only Look Once), SSD (Single Shot MultiBox Detector), and the like have been proposed.

In addition, in recent years, a technique called semantic segmentation has been proposed in which an image is divided for each region using a neural network and labeling is performed for each divided region (Patent Document 3).

As the semantic segmentation method, FCN (Fully Convolutional Network), SegNet, U-Net, PSPNet (Pyramid Scene Parsing Network), and the like have been proposed.

REFERENCES

Patent Documents

[Patent Document 1] Japanese Published Patent Application No. 2018-124672
[Patent Document 2] Japanese Published Patent Application No. 2017-55177
[Patent Document 3] Japanese Translation of PCT International Application No. 2018-535491

SUMMARY OF THE INVENTION

Problems to be Solved by the Invention

Information terminals such as smartphones or tablets are generally operated with touch panels. On the other hand, in the case where users cook while seeing these information terminals, the users need to operate the information terminals in accordance with cooking processes. However, when water, ingredients, seasoning, and the like are attached to user's hands during cooking, the users sometimes cannot operate the information terminals correctly, which is inconvenient. In addition, when such hands touch the information terminals, the information terminals become dirty and become out of order due to contamination, which is not preferable. Furthermore, it is not preferable to continue cooking with the hands that have touched the information terminals for food hygienic reasons.

In addition, there are a water supply and a fire origin such as a cooking stove in a kitchen, and carrying an information terminal in the kitchen might result in a breakdown of the information terminal due to water or fire. Furthermore, in the case where there is an electromagnetic cooker in the kitchen, an electromagnetic field might cause malfunction or failure of the information terminal.

An object of one embodiment of the present invention is to provide a data processing system capable of acquiring information without using hands. Another object of one embodiment of the present invention is to provide a data processing device capable of acquiring information without using hands. Another object of one embodiment of the present invention is to provide a data processing method capable of acquiring information without using hands. Another object of one embodiment of the present invention is to provide a cooking assistance system capable of acquiring information without using hands. Another object of one embodiment of the present invention is to provide a cooking assistance device capable of acquiring information without using hands. Another object of one embodiment of the present invention is to provide a cooking assistance method capable of acquiring information without using hands.

Means for Solving the Problems

One embodiment of the present invention is a data processing system that includes a wearable device including a display means and an imaging means and a database that is connected to the wearable device through a network. The database includes at least one of pieces of information on a cooking recipe, a cooking method, and a material. The wearable device detects a first material by the imaging means. The wearable device collects information on the first material from the database. When the first material exists in a specific region in an imaging range of the imaging means, the information on the first material is displayed on the display means. When the first material does not exist in the specific region, the information on the first material is not displayed on the display means.

In the above, it is preferable that a cooking method using the first material be displayed on the display means based on the cooking recipe.

In the above, it is preferable that the information on the first material contain a cutting position of the first material.

In the above, it is preferable that the information on the first material contain a position of a bone included in the first material.

In the above, it is preferable that the wearable device be a glasses-like wearable device.

In the above, it is preferable that the database be stored in a server.

One embodiment of the present invention is a data processing system that includes a wearable device including a display means and an imaging means and a cooking device including a temperature sensor. The wearable device and the temperature sensor are connected to each other through a first network. The wearable device detects the cooking device by the imaging means. The wearable device collects information on internal temperature of the cooking device from the temperature sensor. When the cooking device exists in a specific region in an imaging range of the imaging means, the information on the temperature is displayed on the display means. When the cooking device does not exist in the specific region, the information on the temperature is not displayed on the display means.

In the above, the data processing system preferably further includes a database. The database is preferably connected to the wearable device and the temperature sensor through a second network including the first network. The database preferably receives the information on the temperature through the second network. The database preferably calculates time required for heating the cooking device from the information on the temperature and displays the calculated time on the display means.

In the above, it is preferable that the wearable device be a glasses-like wearable device.

In the above, it is preferable that the database be stored in a server.

One embodiment of the present invention is a data processing method using a wearable device including a display means and an imaging means. The wearable device is worn by a user so that the user is able to see a material or a cooking device through the display means. The data processing method includes a step of detecting a cutting board existing on a user's gaze by using the imaging means, a step of identifying a first material provided on the cutting board, a step of displaying a cooking method on the display means, and a step of displaying a cutting position of the first material on the display means so that the cutting position overlaps the first material on the user's gaze.

In the above, the data processing method preferably further includes a step of displaying a position of a foreign matter existing on a surface of the material or inside the material so that the position overlaps the material on the user's gaze.

In the above, the foreign matter is preferably one selected from a bone, a scale, a parasite, and a hair.

In the above, it is preferable that the wearable device be a glasses-like wearable device.

Effect of the Invention

One embodiment of the present invention can provide a data processing system capable of acquiring information without using hands. Another embodiment of the present invention can provide a data processing device capable of acquiring information without using hands. Another embodiment of the present invention can provide a data processing method capable of acquiring information without using hands. Another embodiment of the present invention can provide a cooking assistance system capable of acquiring information without using hands. Another embodiment of the present invention can provide a cooking assistance device capable of acquiring information without using hands. Another embodiment of the present invention can provide a cooking assistance method capable of acquiring information without using hands.

MODE FOR CARRYING OUT THE INVENTION

Embodiment 1

In this embodiment, a data processing system according to one embodiment of the present invention will be described. The data processing system in this embodiment can assist a user in cooking.

The data processing system in this embodiment enables the user to cook while utilizing an information terminal. It is preferable that the user can wear the information terminal. In this embodiment, an example is illustrated in which a wearable device is used as the information terminal utilized by the user. In addition, the wearable device illustrated in this embodiment is preferably a glasses-like wearable device, and such a wearable device is sometimes referred to as AR glasses.

Usage Example of AR Glasses

Figure 1:
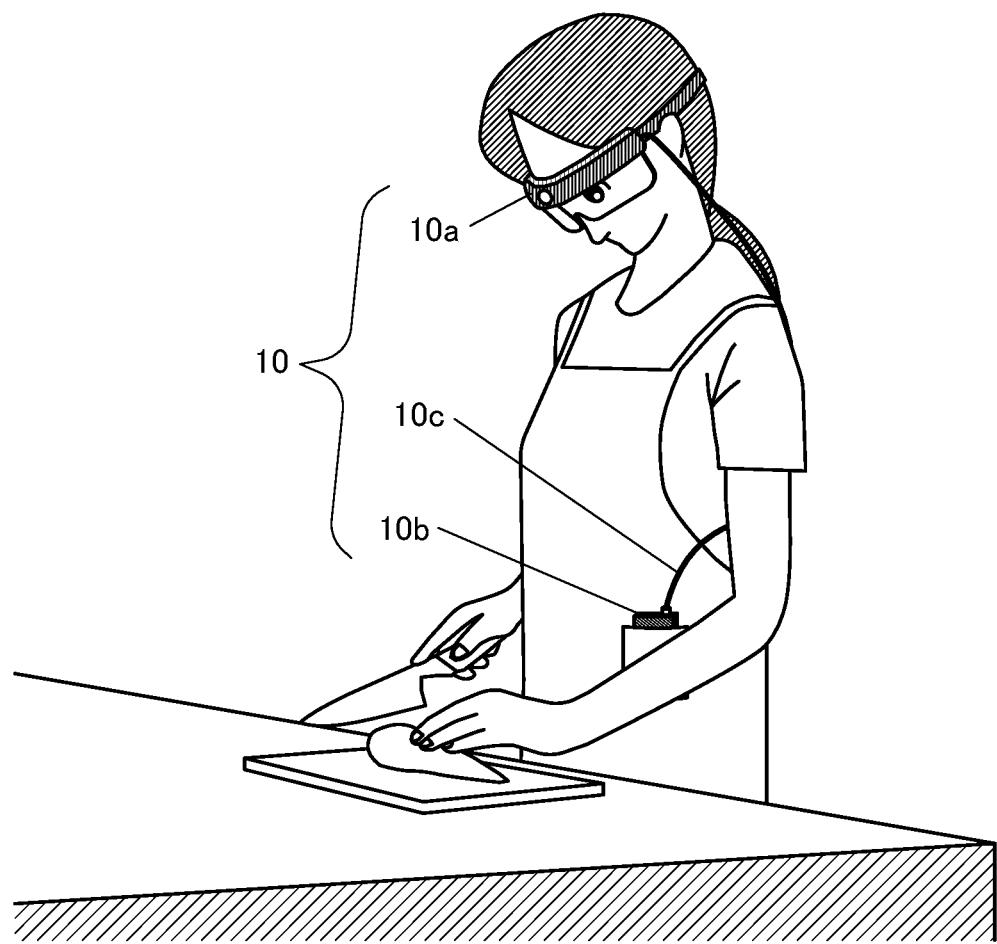
FIG. 1 is a schematic diagram illustrating an example of a method for using AR glasses according to one embodiment of the present invention.

FIG. 1 illustrates an example in which the user cooks while wearing AR glasses 10. Note that AR is an abbreviation of Augmented Reality, and the AR glasses 10 can project information such as an image or a character on an external world seen by the user.

For example, the AR glasses 10 can display information that is required for the user in cooking, such as information on a cooking recipe, a cooking method, or a material, for the user. Here, the material includes a material that is required for cooking, such as a plant-based material such as a grain, a vegetable, a fruit, or seaweed; an animal-based material such as seafood, meat, an egg, a dairy product, or a bone; seasoning; fragrance; oil; or a food additive. In addition, the material is sometimes referred to as an ingredient. The user can acquire information that is required for cooking through the AR glasses 10 even when both hands are full.

The AR glasses 10 are composed of a glass portion 10a, a housing 10b, and a wiring 10c. The wiring 10c connects the glass portion 10a to the housing 10b. In FIG. 1, the housing 10b is stored in an apron pocket. Note that in the case where wireless communication is possible between the glass portion 10a and the housing 10b, the wiring 10c may be omitted. In addition, all components required for the AR glasses 10 fit in the glass portion 10a, the housing 10b and the wiring 10c may be omitted.

Structure Example of AR Glasses

Figure 2:
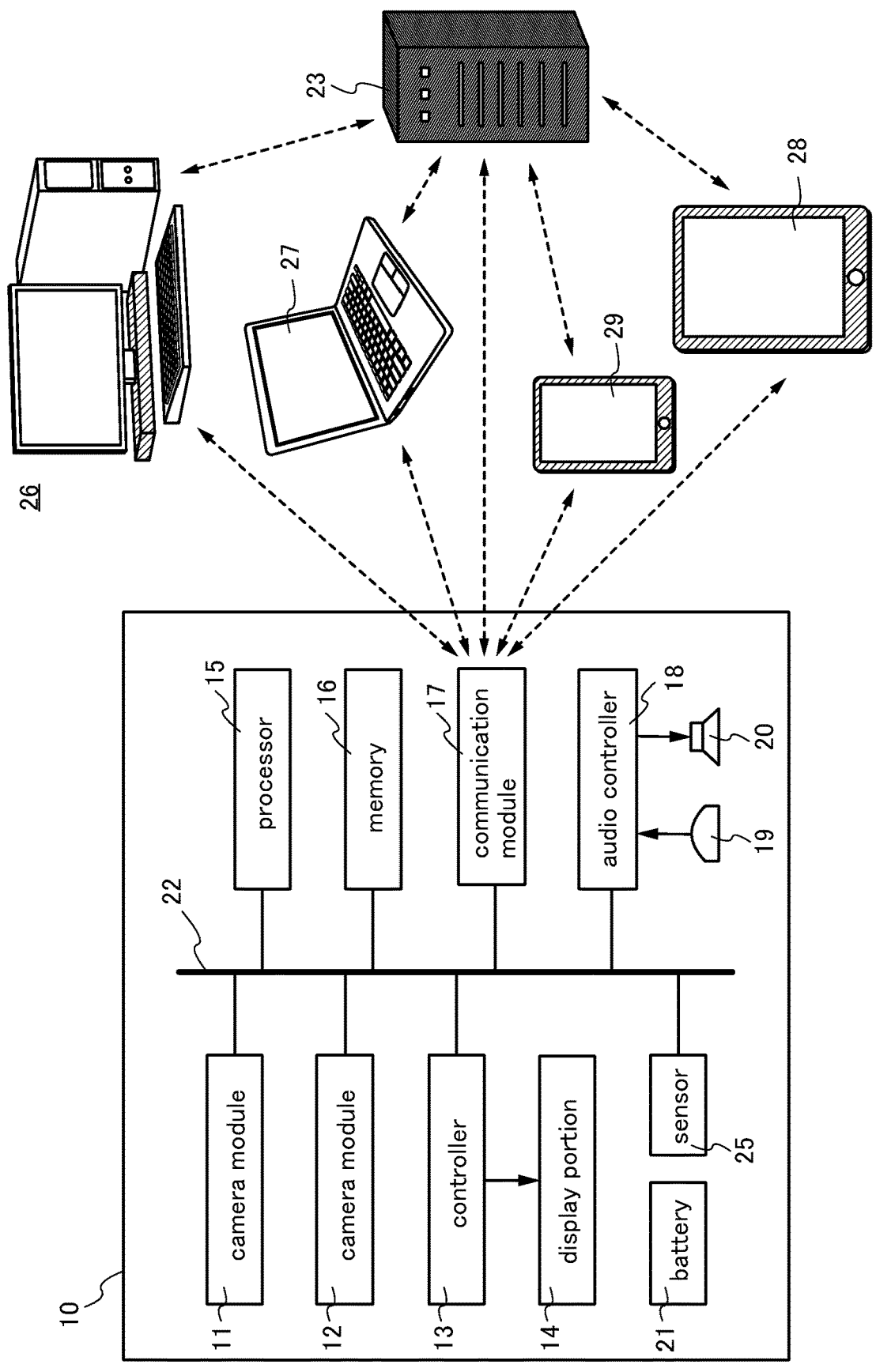
FIG. 2 is a block diagram illustrating one embodiment of the present invention.

FIG. 2 is a block diagram illustrating a structure example of the AR glasses 10. The AR glasses 10 include a first camera module 11, a second camera module 12, a controller 13, a display portion 14, a processor 15, a memory 16, a communication module 17, an audio controller 18, a microphone 19, a speaker 20, a battery 21, a sensor 25, and a bus 22.

The first camera module 11, the second camera module 12, the controller 13, the processor 15, the memory 16, the communication module 17, the sensor 25, and the audio controller 18 exchange data through the bus 22.

The first camera module 11 has a function of acquiring the visual field of the user as an image. In addition, the second camera module 12 has a function of capturing eyeball movement of the user and detecting a user's gaze.

Although details are described later, a variety of information is displayed on the display portion 14 in accordance with an image taken by the first camera module 11; thus, it is preferable that an imaging direction of the first camera module 11 be substantially aligned with the user's gaze. In addition, an imaging range of the first camera module 11 preferably includes a visual field that can be seen by the user through the AR glasses 10. In other words, a specific region in the imaging range of the first camera module 11 is preferably aligned with the visual field that can be seen by the user through the AR glasses 10.

The audio controller 18 has a function of analyzing an audio signal acquired by the microphone 19 and converting the audio signal into a digital signal. In addition, the audio controller 18 has a function of generating an audio signal output to the speaker 20.

The controller 13 has a function of generating an image to be displayed on the display portion 14.

The communication module 17 has a function of communicating with a database through a network such as the Internet. This enables the AR glasses 10 to communicate with the database through the network. Data downloaded from the database is stored in the memory 16. The database is preferably stored in a server 23. In that case, the AR glasses 10 are connected to the server 23 through the network by using the communication module 17. Alternatively, the AR glasses 10 may be connected to the server 23 through a device that is connected to the AR glasses 10 and the server 23 through the network. A desktop computer 26, a laptop computer 27, a tablet computer 28 (a tablet terminal), a smartphone 29, or the like can be used as the device.

In addition, the database may be stored in the device. Furthermore, the user can register user information in the AR glasses 10 and the database by using the device, set usage conditions, and register a cooking device to be used by the user, for example.

For example, the server 23 preferably performs machine learning using teacher data. The AR glasses 10 can download a learning result obtained by the learning and can store the downloaded learning result in the memory 16.

The battery 21 has a function of supplying power to each device included in the AR glasses 10.

The processor 15 has a function of comprehensively controlling the devices that are connected to the bus 22. For example, the processor 15 comprehensively judges information acquired from the first camera module 11, the second camera module 12, the communication module 17, and the audio controller 18 and gives an instruction to the controller 13. The controller 13 generates image data according to the instruction from the processor 15 and displays the image data on the display portion 14.

As the display portion 14, what is called a see-through panel, which transmits external light, is preferably used. Examples of the see-through panel include an organic EL (Electro Luminescence) display, a liquid crystal display, and the like.

The higher definition of the see-through panel, the better. The pixel density of the see-through panel can be higher than or equal to 1000 ppi and lower than or equal to 50000 ppi, preferably higher than or equal to 2000 ppi and lower than or equal to 50000 ppi, further preferably higher than or equal to 3000 ppi and lower than or equal to 50000 ppi, still further preferably higher than or equal to 5000 ppi and lower than or equal to 50000 ppi. Typically, the pixel density can be higher than or equal to 4500 ppi and lower than or equal to 5500 ppi, higher than or equal to 5500 ppi and lower than or equal to 6500 ppi, or higher than or equal to 6500 ppi and lower than or equal to 7500 ppi.

In addition, the higher resolution of the see-through panel, the better. The number of pixels in the see-through panel in a scan line direction or a signal line direction is, for example, greater than or equal to 1000 and less than or equal to 20000, preferably greater than or equal to 2000 and less than or equal to 20000, further preferably greater than or equal to 3000 and less than or equal to 20000. When two see-through panels are provided for a left eye and a right eye, the shape of a display region can be close to a regular square (the ratio of lateral length to longitudinal length is greater than or equal to 0.8 and less than or equal to 1.2). In contrast, when one display region is used for a right eye and a left eye, the shape of the display region is preferably a laterally-long rectangle (e.g., the ratio of lateral length to longitudinal length is greater than or equal to 1.5 and less than or equal to 5.0). Furthermore, the see-through panel may meet the standard of television whose aspect ratio is 16:9. In that case, the see-through panel can have the resolution of the FHD standard, the 4K2K standard, or the 8K4K standard.

In addition, the display portion 14 may include a device that projects an image on a reflective plate provided in front of the user. In that case, the display portion 14 includes an optical member such as a light guide plate or a half mirror and a light-emitting element. Examples of the light-emitting element include an organic EL element, an LED (Light Emitting Diode) element, and an inorganic EL element.

In addition, the display portion 14 may include a retina projection type display device. The retina projection type display device is a device that projects an image on a retina of the user by irradiation of the retina with a laser beam with low intensity. In that case, the display portion 14 includes a laser oscillator, optical systems (a light guide plate, a reflective plate, a half mirror, and the like), and the like. Furthermore, the laser oscillator is preferably controlled by a MEMS (Micro Electro Mechanical System).

The user who wears the AR glasses 10 can see a material or equipment that is required for cooking through the display portion 14. On the user's gaze, information on a material or a cooking device seen by the user is displayed on the display portion 14. In other words, when seen from the user, the information on the material or the cooking device is displayed on the display portion 14 to overlap the material or the cooking device.

In addition, the AR glasses 10 may further include the sensor 25 such as an acceleration sensor, a gyroscope sensor, a temperature sensor, or an ocular potential sensor. The ocular potential sensor is a sensor that senses a potential change caused by eye movement and is provided in the glass portion 10a. When the AR glasses 10 include an ocular potential sensor, it is possible to analyze the eye movement of the user and track the user's gaze.

In the AR glasses 10, among the structural elements illustrated in FIG. 2, the processor 15, the memory 16, the communication module 17, and the battery 21 may be included in the housing 10b, and other components may be included in the glass portion 10a. This leads to weight saving of the glass portion 10a and a reduction in the burden felt by the user.

In addition, in the case where there is no burden on the user, among the structural elements illustrated in FIG. 2, only the battery 21 may be included in the housing 10b, and other components may be included in the glass portion 10a. When the devices that are connected to the bus 22 arranged to be close to each other, an improvement in processing speed and power saving are possible.

Furthermore, in the case where the battery 21 can be further downsized, all the structural elements of the AR glasses 10 may be included in the glass portion 10a. In that case, the housing 10b and the wiring 10c are unnecessary.

<Details of System>

Details of a data processing system using the AR glasses 10 are described using FIG. 3 to FIG. 10. Note that in the following description, the data processing system is simply abbreviated as a "system."

Figure 3:
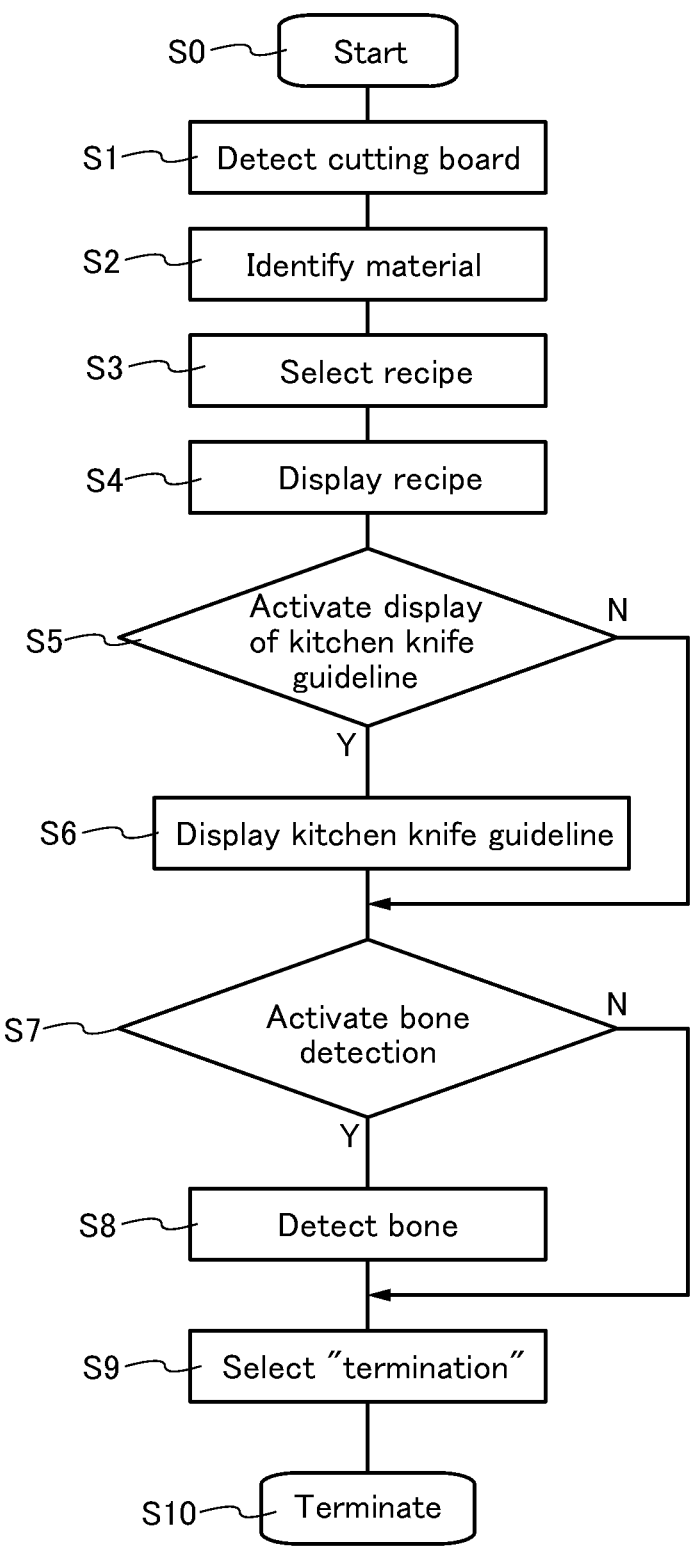
FIG. 3 is a flow chart showing one embodiment of the present invention.

FIG. 3 is a flow chart showing a process flow of the system. FIG. 3 includes Step S0 to Step S10. The details of the system are described below sequentially from Step S0. Note that in this embodiment, the case where fish preparation is performed using the AR glasses 10 is described.

Figure 4A:
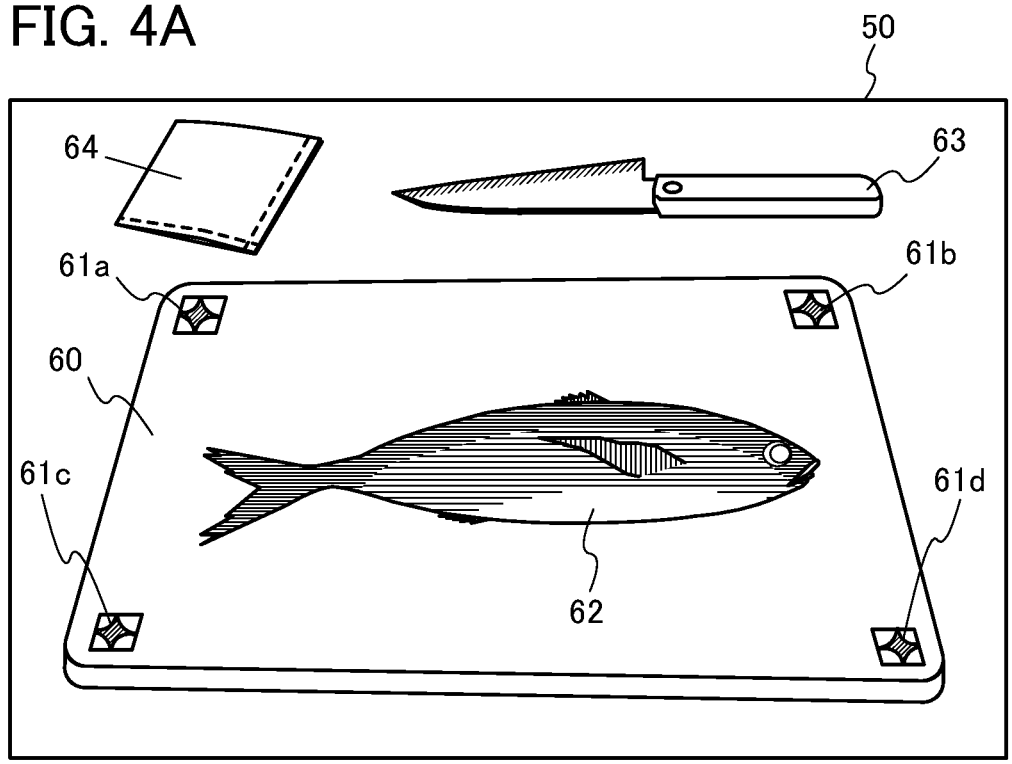
FIG. 4A and FIG. 4B are schematic diagrams illustrating one embodiment of the present invention.

First, in Step S0, the user starts the system. A visual field 50 illustrated in FIG. 4A represents a visual field seen by the user through the AR glasses 10 immediately after the start of the system. In FIG. 4A, a cutting board 60, a material 62, a kitchen knife 63, and a dishcloth 64 exist in the visual field 50. In this embodiment, an example in which fish is used as the material 62 is illustrated. Note that the imaging range of the first camera module 11 preferably includes the visual field 50. In other words, the specific region in the imaging range of the first camera module 11 is preferably aligned with the visual field 50.

The cutting board 60 is preferably a plain cutting board with few stains and scratches. In addition, markers 61a, 61b, 61c, and 61d are provided at four corners of the cutting board 60.

The markers 61a to 61d may be directly printed on the cutting board 60 or may be attached to the cutting board by the user like stickers. Note that the number of markers is not limited thereto, and for example, markers may be provided at only three corners of the cutting board 60.

Figure 4B:
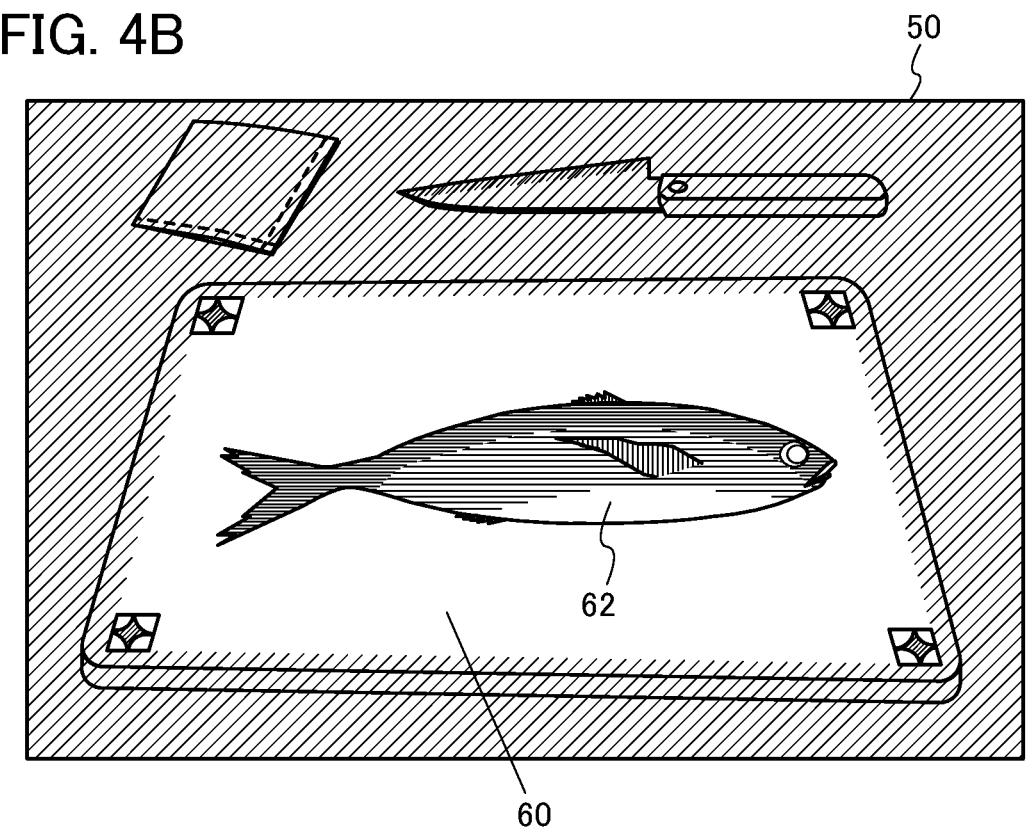

Next, in Step S1, the system senses the markers 61a to 61d by using the first camera module 11 and senses the position of the cutting board 60. The system adds only a region surrounded by the markers 61a to 61d to an analysis object and excludes outer regions from the analysis object. For example, as illustrated in FIG. 4B, the system excludes diagonally shaded regions in the diagram from the analysis object.

The system attempts to recognize the material 62 by image analysis. However, for example, when surroundings of the cutting board 60, such as the kitchen knife 63 and the dishcloth 64, are also added to objects subjected to the image analysis, they adversely affect the recognition accuracy of the material 62. As illustrated in FIG. 4B, when the system excludes the surroundings of the cutting board 60 from the analysis object, the recognition accuracy of the material 62 can be improved. In addition, a reduction in the area of an image that is to be the analysis object leads to higher-speed image analysis.

Note that the region of the cutting board 60 may be detected using an object detection method such as R-CNN, YOLO, or SSD or semantic segmentation such as FCN, SegNet, U-Net, or PSPNet that is described in Background Art, without using markers.

Next, in Step S2, the system identifies the type of the material 62. For example, in FIG. 5A, a rectangle 65 is displayed to surround the material 62, and options of the material 62 are displayed on a menu 70. For identification of the material 62, the object detection method is preferably used. It is preferable that the options of the material 62 be displayed on the menu 70 in order of possibility.

The user can select the type of the material 62 from the candidates displayed on the menu 70. The user can select a menu by voice input. For example, when the user utters voice "horse mackerel," the system analyzes the user's voice and judges that "horse mackerel" is selected.

In addition, the user's gaze can select the menu. For example, the user gazes at an item "horse mackerel" displayed on the menu 70. The AR glasses 10 detect the user's gaze and judge that "horse mackerel" is selected. The user's gaze can be detected using the second camera module 12. Positional relationship between an eye inner corner of the user and an iris is analyzed from an eyeball image of the user that is acquired by the second camera module 12 with the eye inner corner used as a reference point, so that the user's gaze can be detected.

In addition, when an infrared source such as an infrared LED and an infrared detector such as an infrared camera are mounted on the AR glasses 10, the user's gaze can be detected. When a user's eye is irradiated with infrared rays emitted from the infrared source and a reflection position on a cornea (referred to as cornea reflection) is set as a reference point, the user's gaze can be detected through analysis of positional relationship between cornea reflection and a pupil.

Furthermore, in the case where the AR glasses 10 include an ocular potential sensor, the AR glasses 10 may track the user's gaze by analysis of an ocular potential of the user.

At this time, a pointer 51 may be displayed on the menu 70 according to the user's gaze. When the pointer 51 is displayed, the user can judge whether an item intended by the user is selected.

The pointer 51 is displayed only at the time of selecting an item from the menu 70. Alternatively, the user's movement may be sensed by the sensor 25, and display or non-display of the pointer 51 may be performed. For example, the user who wears the AR glasses 10 shakes his or her head up and down or from side to side, so that display or non-display of the pointer 51 may be performed. As a more specific example, display of the pointer 51 can be performed when the user who wears the AR glasses 10 shakes his or her head up and down, and non-display of the pointer 51 can be performed when the user shakes his or her head from side to side.

In this manner, it is preferable that the user can select the menu without using hands. That makes the user operate the system even when both hands are full during cooking.

Meanwhile, movement of the user's hand may be detected using the first camera module 11. When the user places his or her hand, particularly, his or her finger to overlap a desired item of the menu 70 on the display portion 14, the user can select the desired item. In that case, an item to be selected may be determined in a combination with a known gesture recognition method such as finger gesture.

When the AR glasses 10 read the user's movement, the user can operate the system without touching the information terminal.

As described above, the user can operate the system without touching the information terminal; thus, failure or malfunction of the information terminal caused by touch of the information terminal with a wet hand or a hand to which a material adheres can be inhibited. Furthermore, it is preferable for food hygienic reasons because there is no need to continue cooking with the hands that have touched the information terminal.

Note that the menu 70 and the pointer 51 are preferably displayed when the material 62 exists in the visual field 50. In the case where the material 62 does not exist in the visual field 50 because of movement of the user's gaze or movement of the material 62, non-display of the menu 70 and the pointer 51 may be performed. Alternatively, after a certain period of time has passed in a state where the material 62 does not exist in the visual field 50, non-display of the menu 70 and the pointer 51 may be performed.

Figure 5A:
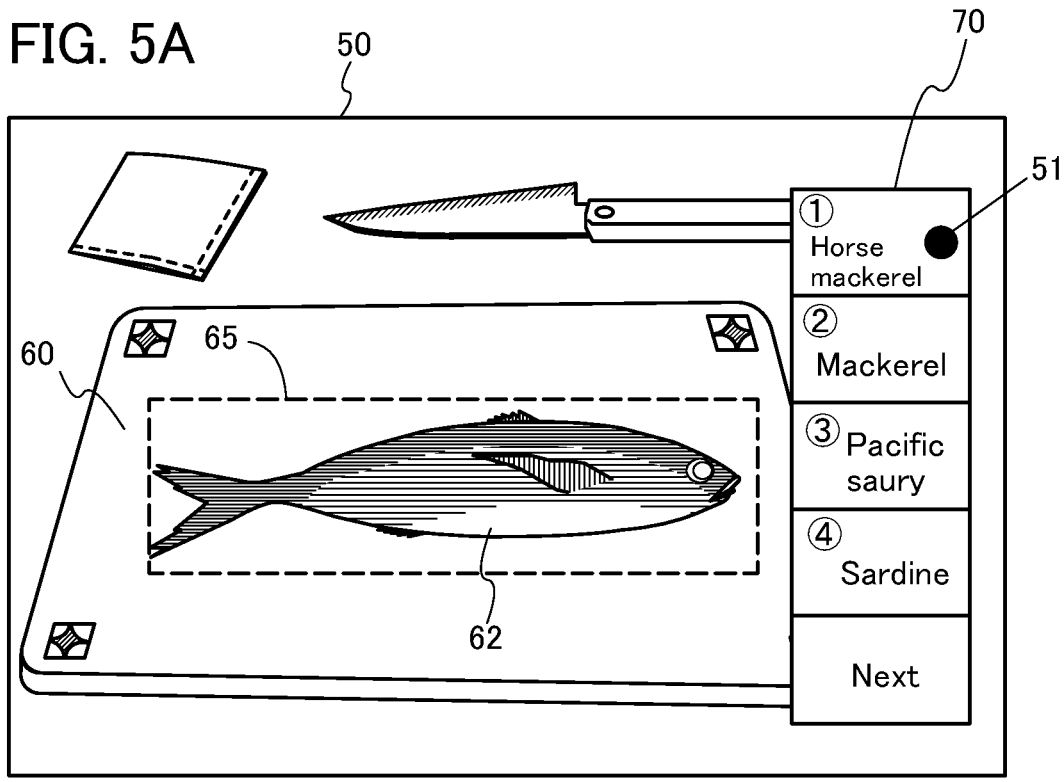
FIG. 5A and FIG. 5B are schematic diagrams illustrating one embodiment of the present invention.
Figure 5B:
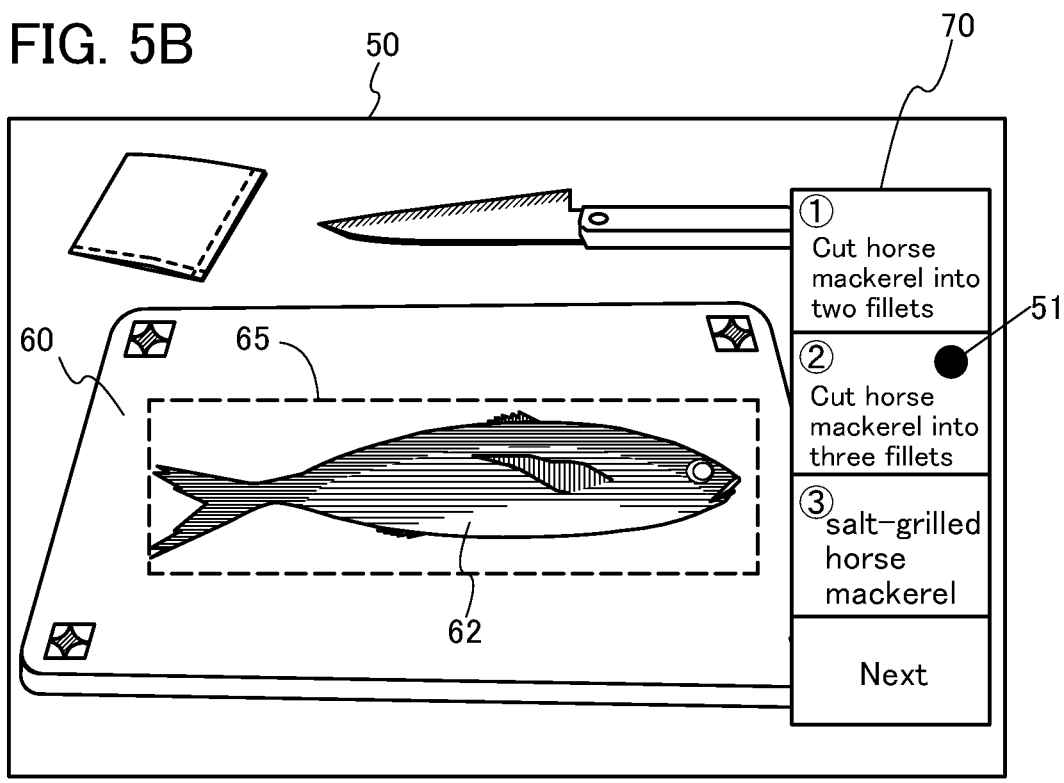

Next, in Step S3, the system displays options of a recipe using the material 62. In FIG. 5B, for example, options of a recipe using a horse mackerel is displayed on the menu 70. The user can select a recipe from the menu 70 by a method similar to that in Step S2. It is preferable that the recipe display information on health, such as a calorie, salt content, or carbohydrates, and a required ingredient or seasoning. In addition, the user can register the number of people to be served food, taste preference, and the like when selecting the recipe.

Figure 6A:
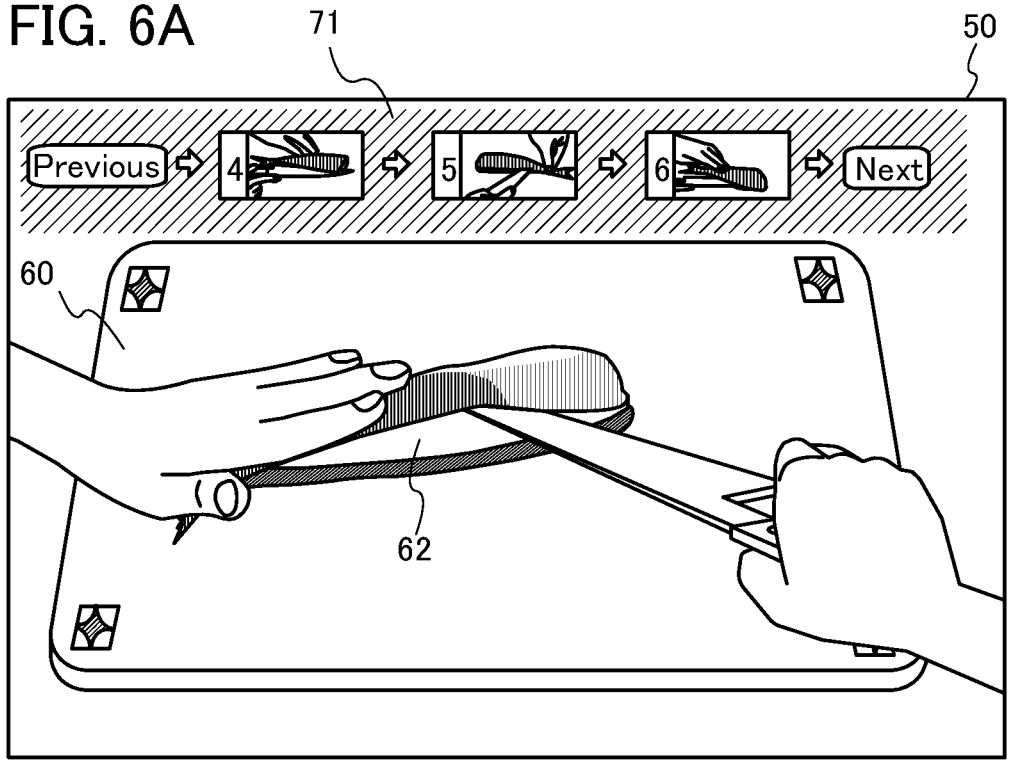
FIG. 6A and FIG. 6B are schematic diagrams illustrating one embodiment of the present invention.

Next, in Step S4, the system displays the recipe selected in Step S3. In FIG. 6A, for example, a recipe 71 is displayed on an upper side of the visual field 50.

Figure 6B:
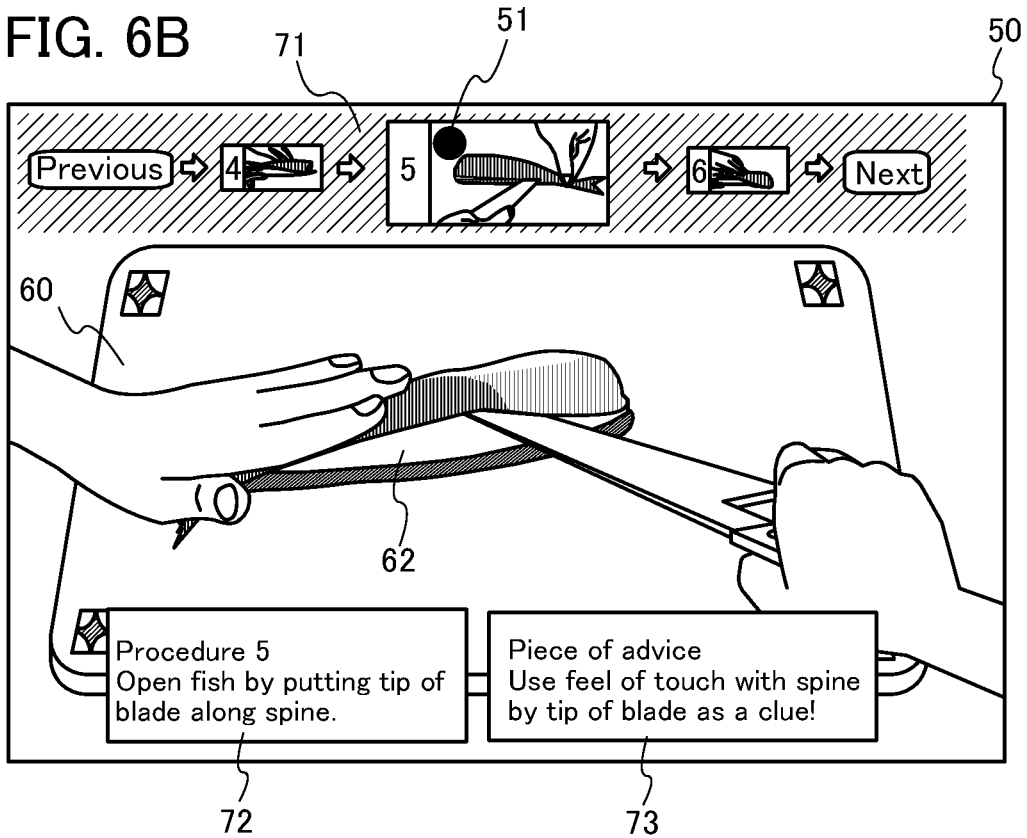

In the recipe 71, each procedure No. and images for showing each procedure are displayed. When the procedure in the recipe 71 is selected by a method similar to that in Step S2, an enlarged image of the selected procedure is displayed (FIG. 6B). In addition, a text 72 for showing the procedure and a text 73 for showing a piece of advice are displayed on a lower side of the visual field 50. Accordingly, the user can grasp a cautionary point of each procedure. Note that the image displayed in the recipe 71 is not limited to a still image, and a moving image may be used.

Note that it is preferable that the recipe 71, the text 72, the text 73, and the pointer 51 be displayed when one of the material 62 and the cutting board 60 exists in the visual field 50. In the case where neither the material 62 nor the cutting board 60 exists in the visual field 50 because of movement of the user's gaze or movement of the material 62 or the cutting board 60, non-display of the recipe 71, the text 72, the text 73, and the pointer 51 may be performed. Alternatively, after a certain period of time has passed in a state where neither the material 62 nor the cutting board 60 exists in the visual field 50, non-display of the recipe 71, the text 72, the text 73, and the pointer 51 may be performed.

Next, in Step S5, the user selects whether to activate or inactivate a display function of a kitchen knife guideline that shows a cutting position of the material. In the case where the kitchen knife guideline is activated, the system displays the kitchen knife guideline that shows an appropriate cutting position of the material in Step S6.

Figure 7:
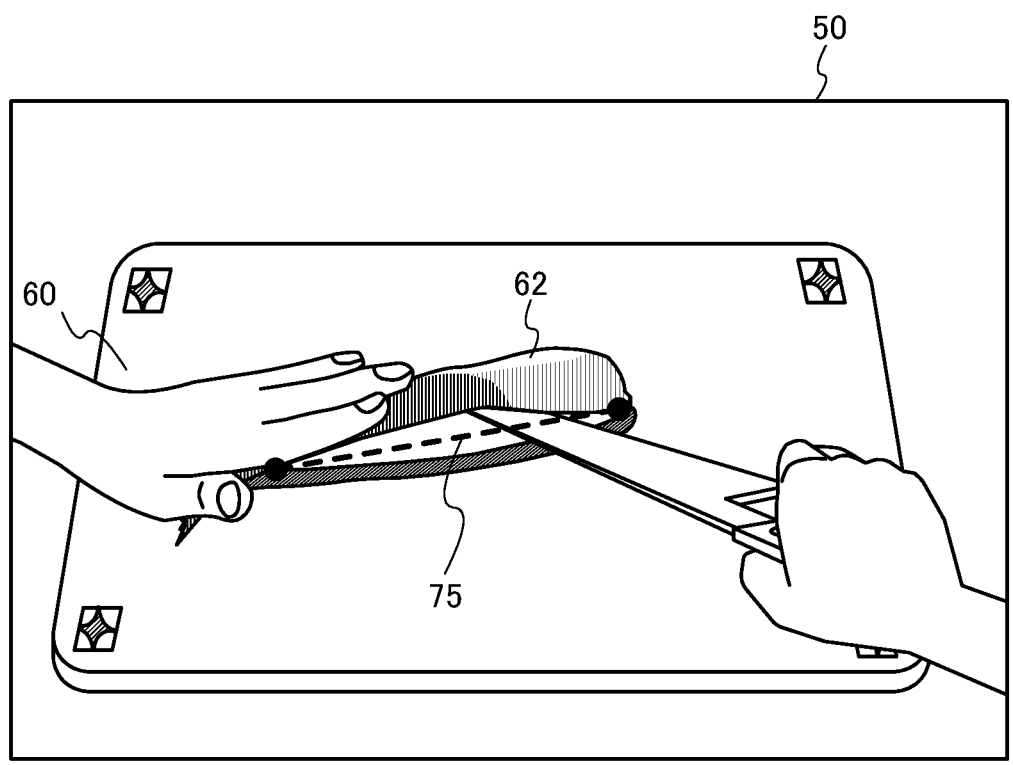
FIG. 7 is a schematic diagram illustrating an example of a method for displaying a guideline according to one embodiment of the present invention.

FIG. 7 illustrates how the visual field 50 is seen when the kitchen knife guideline is displayed. The user fillets fish (the material 62) with a kitchen knife. At this time, the system displays a guideline 75 to overlap the material 62. The user can correctly cut the material 62 and do cooking by inserting a kitchen knife blade along the guideline 75. When the guideline 75 is displayed three-dimensionally along the shape of the material 62, the user can easily cut and process the material 62.

Figure 8A:
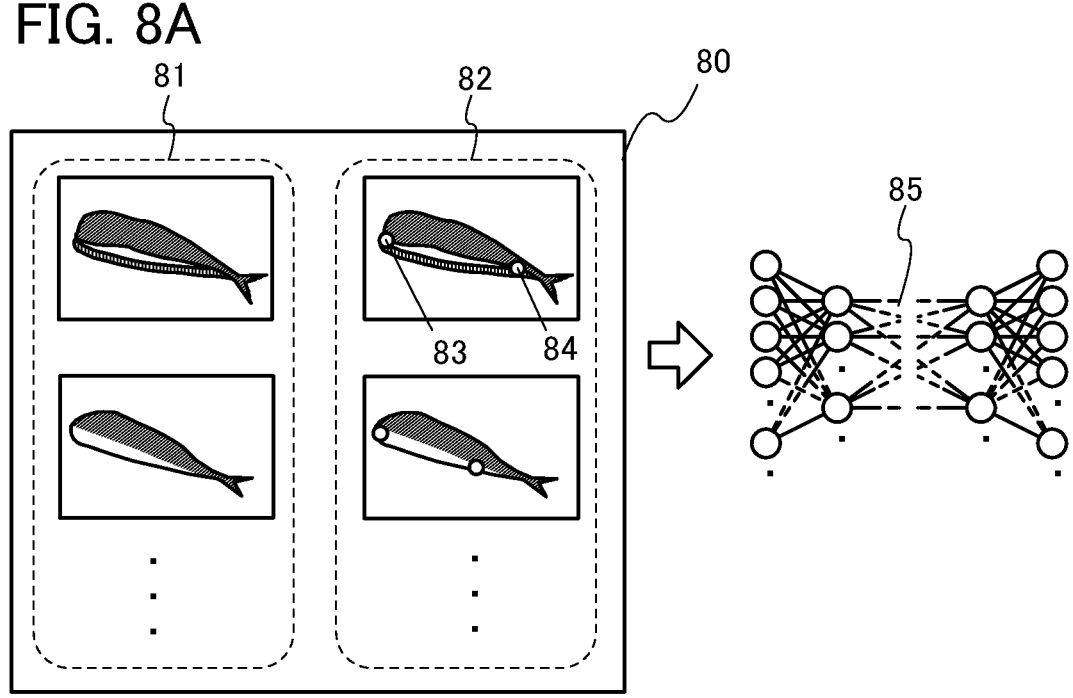
FIG. 8A is a schematic diagram illustrating a method for making a neural network learn teacher data by using machine learning according to one embodiment of the present invention.
Figure 8B:
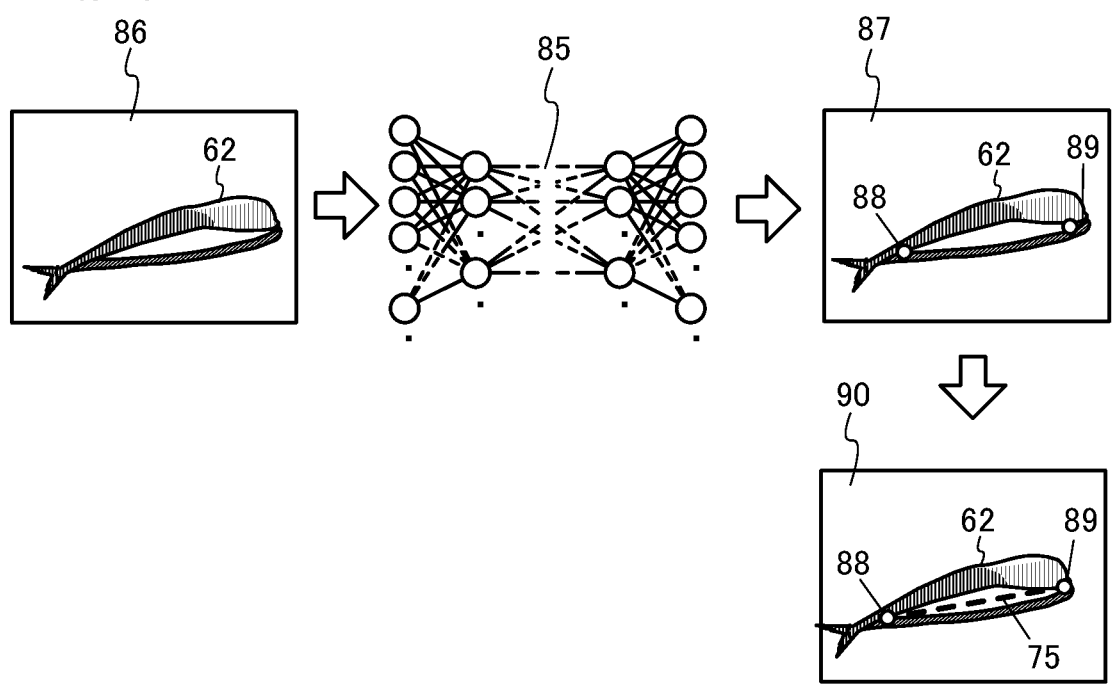
FIG. 8B is a schematic diagram illustrating a method for generating an image by using a neural network that has learned according to one embodiment of the present invention.

A method for making the system display the kitchen knife guideline is described using FIG. 8A and FIG. 8B. The kitchen knife guideline is preferably displayed using machine learning with a neural network.

FIG. 8A illustrates a method for making a neural network learn teacher data. The learning is preferably performed in the server 23 illustrated in FIG. 2.

FIG. 8B illustrates a method for generating a target image by using the neural network that has learned. Processing illustrated in FIG. 8B is performed in the AR glasses 10. The AR glasses 10 download the neural network that has learned from the server 23 and generate the target image.

First, the learning method in FIG. 8A is described. A data set 80 is prepared as teacher data. The data set 80 includes an image set 81 and an image set 82. The image set 81 includes images of a plurality of materials. The image set 82 in which a starting point 83 represented by a circle and an end point 84 also represented by a circle are added to each image of the image set 81 is obtained.

Next, a neural network 85 is made to learn the data set 80. A neural network used for image generation, such as Autoencoder, CAE (Convolutional Autoencoder), VAE (Variational Autoencoder), U-net, or GAN (Generative Adversarial Networks), is preferably used as the neural network 85.

Next, target image generation in FIG. 8B is described. An image 86 is an image of the material 62 acquired by the system. When the image 86 is input to the neural network 85 that has learned, an image 87 in which a starting point 88 and an end point 89 are added to the material 62 is obtained. When the guideline 75 that connects the starting point 88 and the end point 89 is displayed by image processing, a target image 90 in which the kitchen knife guideline is added to the material can be obtained FIG. 3 is described again. In Step S7, the user selects whether to activate or inactive a bone detection function. In the case where bone detection is activated, the system detects a bone in Step S9. Note that the bone detection function is particularly effective in detecting a small bone. The use of the bone detection function can inhibit cooking or serving a material with a remained small bone. In addition, the detection function is also effective in detecting a scale, a parasite, or the like in addition to the bone. The bone, the scale, the parasite, and the like that are not suitable for food are referred to as foreign matters. Thus, the bone detection function can be referred to as a foreign matter detection function.

Figure 9:
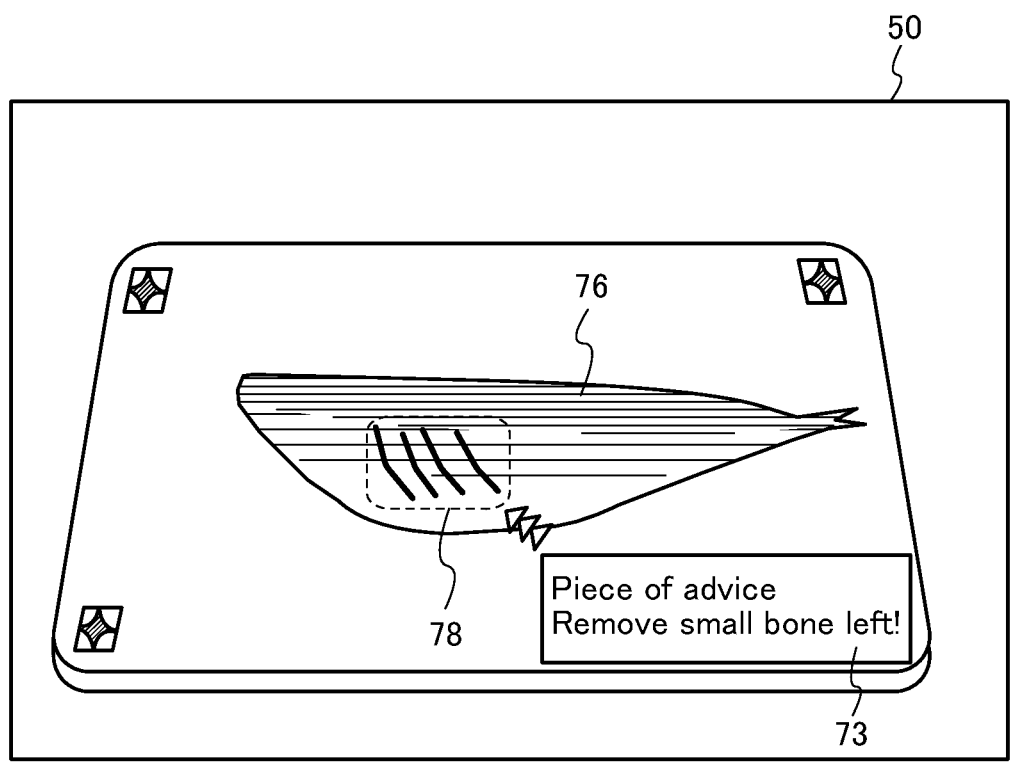
FIG. 9 is a schematic diagram illustrating a method for generating an image according to one embodiment of the present invention.

FIG. 9 illustrates how the visual field 50 is seen when the bone detection is activated. A material 76 represents a fish fillet. For example, the material 76 is part of a fillet cut from the material 62. When the material 76 is seen through the AR glasses 10, a bone 78 contained in the material 76 is highlighted. Accordingly, the user can easily find and remove a bone contained in the fish fillet regardless of the bone size.

In addition, the text 73 may be displayed for the detected bone 78. It is preferable that the text 73 contain information on the bone 78 or advice on how to handle the bone 78 or the like. For example, in the case where the detected bone 78 is a small bone that should be removed, information on detection of the small bone and advice for promoting removal of the small bone is displayed as the text 73.

Figure 10A:
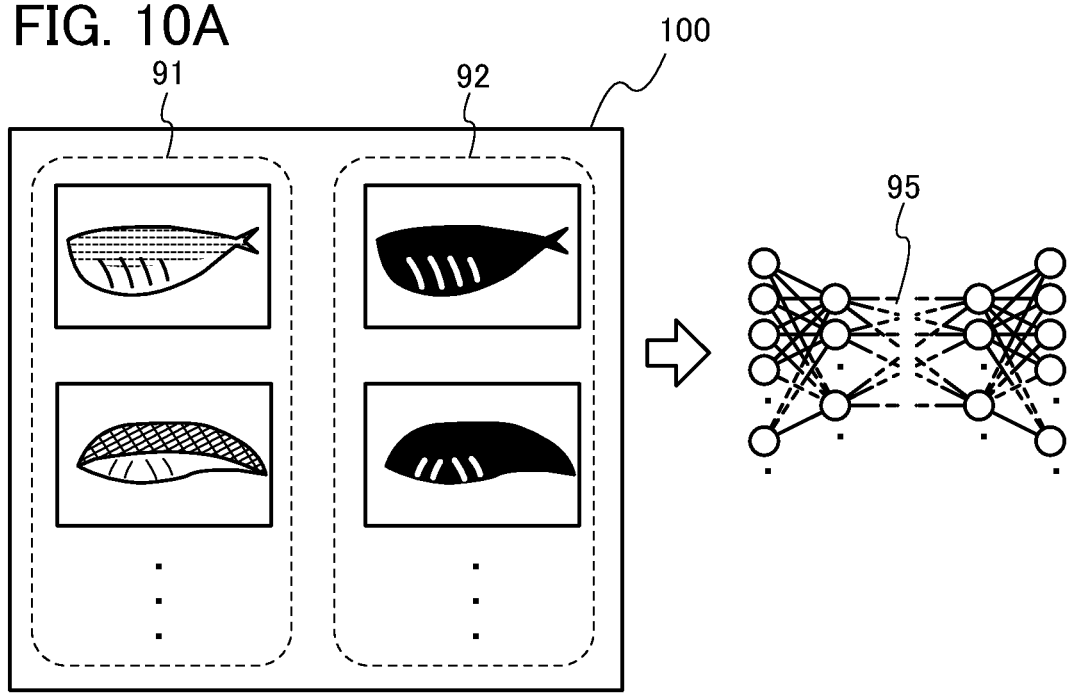
FIG. 10A is a schematic diagram illustrating a method for making a neural network learn teacher data by using machine learning according to one embodiment of the present invention.
Figure 10B:
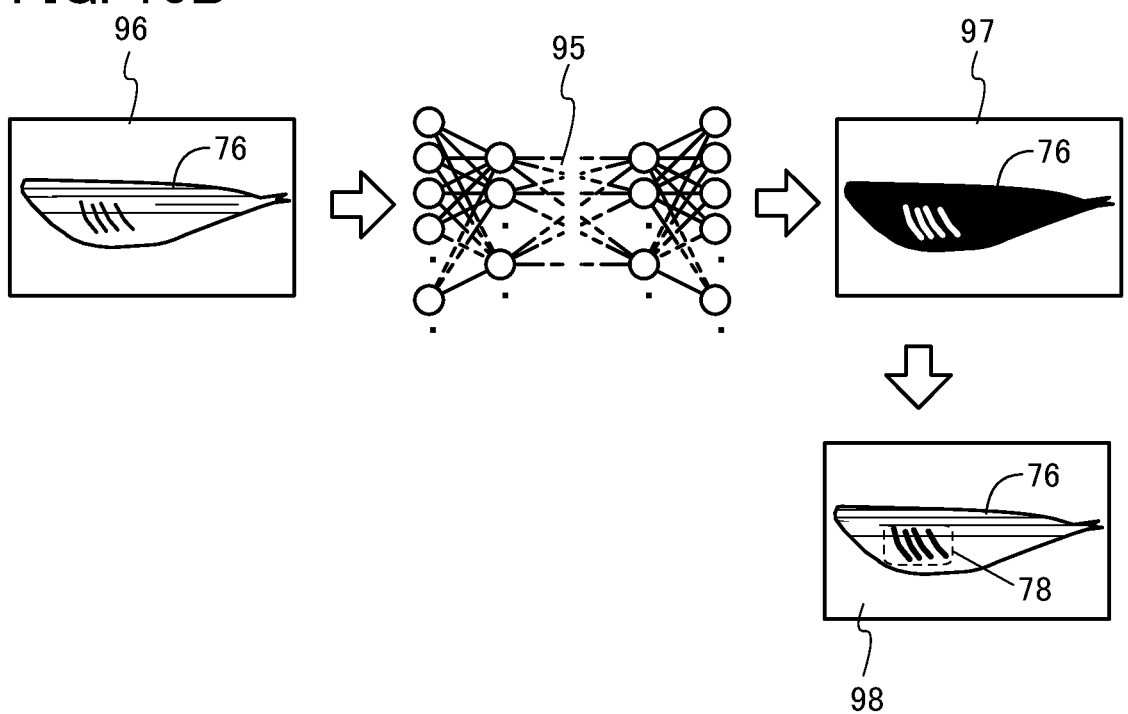
FIG. 10B is a schematic diagram illustrating a method for generating an image by using a neural network that has learned according to one embodiment of the present invention.

A method for sensing a bone contained in fish is described using FIG. 10A and FIG. 10B. For sensing the bone, a method called Semantic Segmentation is preferably used.

FIG. 10A illustrates a method for making a neural network learn teacher data. The learning is preferably performed in the server 23 illustrated in FIG. 2.

FIG. 10B illustrates a method for generating a target image by using the neural network that has learned. Processing illustrated in FIG. 1B is performed in the AR glasses 10. The AR glasses 10 download the neural network that has learned from the server 23 and generate the target image.

First, the learning method in FIG. 10A is described. A data set 100 is prepared as teacher data. The data set 100 includes an image set 91 and an image set 92. The image set 91 includes images of a plurality of materials (fish fillets in this case). In the image set 92, a bone region and other regions of each image in the image set 91 are separately colored.

Next, a neural network 95 is made to learn the data set 100. A neural network used for Semantic Segmentation, such as FCN, SegNet, U-net, or PSPNet, is preferably used as the neural network 95.

Next, target image generation in FIG. 10B is described. An image 96 is an image of the material 76 acquired by the system. When the image 96 is input to the neural network 95 that has learned, an image 97 in which a bone region and other regions of the material 76 are separately colored is obtained. When the image 97 and the image 96 are synthesized, an image 98 in which a bone of the material 76, particularly, a small bone is emphasized can be obtained.

Note that by using a technique such as object detection or Semantic Segmentation, the system can detect not only a bone but also a fish scale or a parasite on fish. In addition, in the case where the material 76 is not fish, a hair, a feather, and the like are also included in foreign matters. Furthermore, in the case where the material is a marine crustacea or shellfish, a shell, a piece of shellfish, sand, and the like are also included in foreign matters. Moreover, a hair of the user or a person who is related to cooking, such as a cook, and part of clothing such as lint and fiber are also included in the foreign matters. The detection function of the system preferably detects every foreign matter that is not suitable for food. In particular, adhesion or mixing of a hair to or in the material is not preferable for hygienic reasons. It is preferable to detect and remove the hair by using the system.

Finally, in Step S9, when the user selects "termination," the system is terminated (Step S10).

As described above, one embodiment of the present invention can provide a data processing system capable of acquiring information without using hands. Another embodiment of the present invention can provide a data processing device capable of acquiring information without using hands. Another embodiment of the present invention can provide a data processing method capable of acquiring information without using hands. Another embodiment of the present invention can provide a cooking assistance system capable of acquiring information without using hands. Another embodiment of the present invention can provide a cooking assistance device capable of acquiring information without using hands. Another embodiment of the present invention can provide a cooking assistance method capable of acquiring information without using hands.

The structures, the compositions, the methods, and the like described in this embodiment can be used in an appropriate combination with the structures, the compositions, the methods, and the like described in the other embodiments and examples.

Embodiment 2

Although the above embodiment illustrates the example of fish as the material, the present invention is not limited thereto. Seafood other than fish; meat of a mammal such as a cow, a pig, or a sheep; meat of a bird such as a chicken, a duck, or a turkey; a reptile such as a snake or a lizard; an amphibian such as a frog; an insect such as a cricket; a vegetable; a fruit; a mushroom; or the like can be used as the material. In this embodiment, an example in which a vegetable is used as a material 77 is illustrated.

Note that a cooking device and items and the like displayed on the display portion 14 that are common to those in the above embodiment are denoted by the same reference numerals, and a detailed description thereof is sometimes omitted.

Figure 11A:
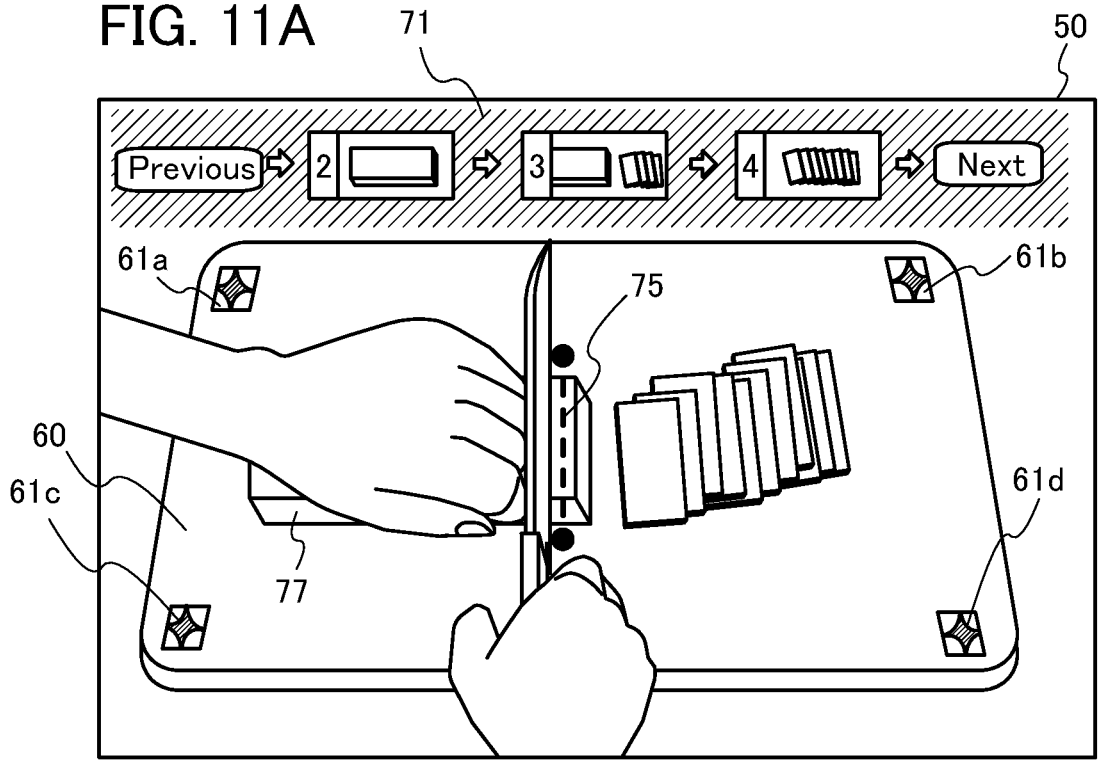
FIG. 11A and FIG. 11B are schematic diagrams illustrating one embodiment of the present invention.

FIG. 11A illustrates the visual field 50 of the user who sees, through the AR glasses 10, a situation where the material 77 is provided on the cutting board 60. The recipe 71 and the guideline 75 are displayed on the display portion 14 of the AR glasses 10. The user can cut the material 77 while aligning a kitchen knife with the guideline 75.

Figure 11B:
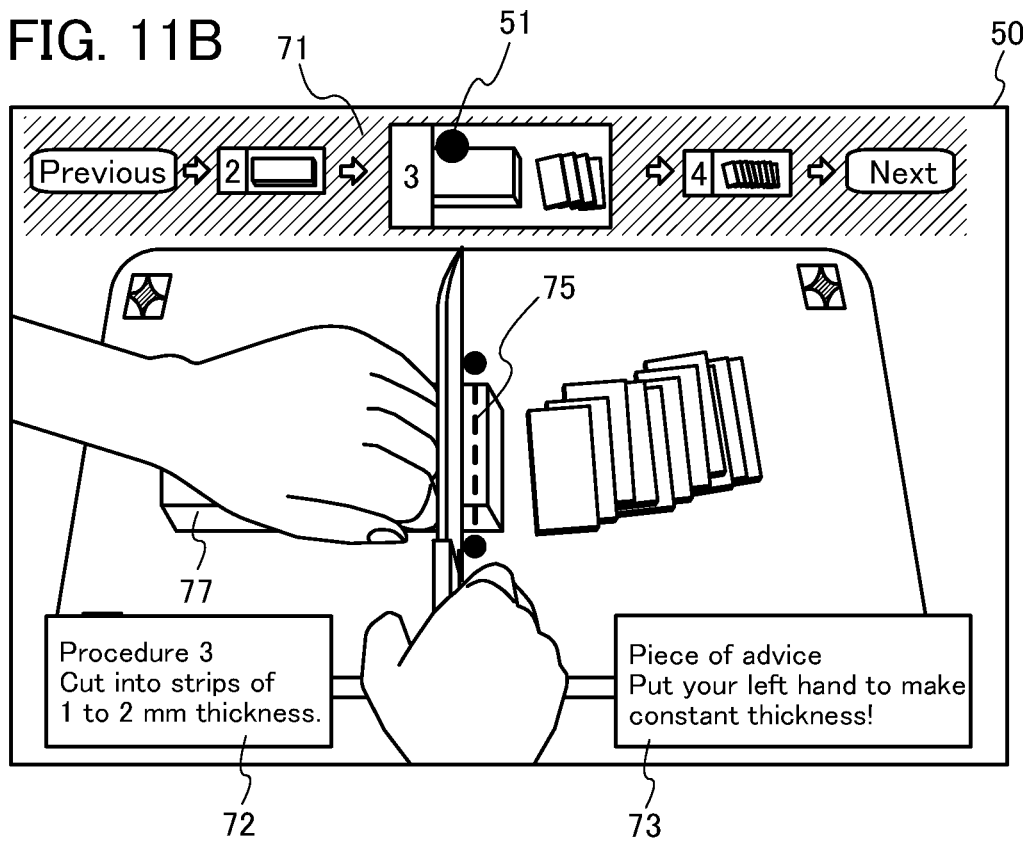

FIG. 11B illustrates a situation where the user's gaze is sensed by the AR glasses 10 and a desired procedure is selected from the recipe 71. The pointer 51 is displayed on the recipe 71 in accordance with the user's gaze, and the user can select a procedure while confirming the position of the pointer 51.

When the desired procedure is selected by the user, an enlarged image of the selected procedure is displayed. In addition, the text 72 for showing the procedure and the text 73 for showing a piece of advice are displayed on the lower side of the visual field 50. Accordingly, the user can grasp a cautionary point of each procedure. Note that the image displayed in the recipe 71 is not limited to a still image, and a moving image may be used.

Figure 12A:
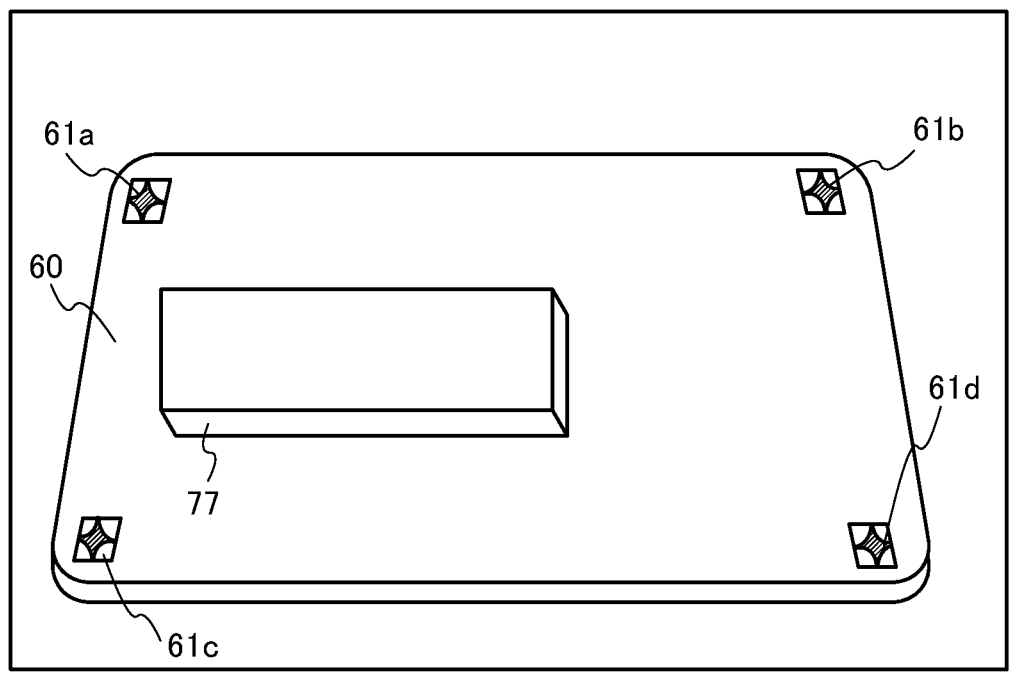
FIG. 12A and FIG. 12B are schematic diagrams each illustrating an example of a method for displaying a guideline according to one embodiment of the present invention.
Figure 12B:
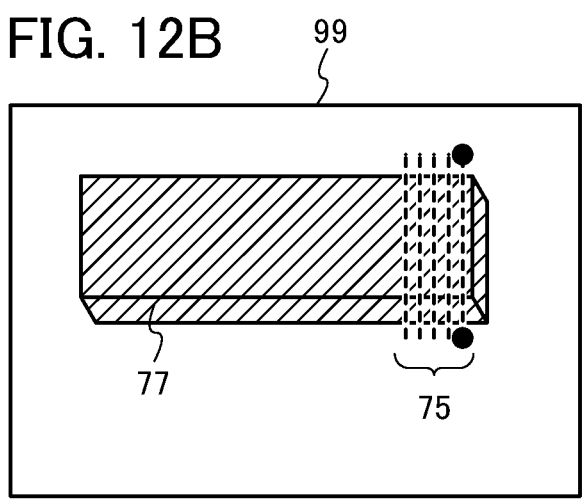

A method for making the system display a kitchen knife guideline is described using FIG. 12A and FIG. 12B. The kitchen knife guideline is preferably displayed using machine learning with a neural network.

As in the above embodiment, the system senses the markers 61a to 61d by using the first camera module 11 and senses the position of the cutting board 60 (FIG. 12A).

Next, the material 77 on the cutting board is sensed and options of the material 77 and options of the recipe are displayed for the user. The user identifies the material 77 and selects the recipe by using a method similar to that in the above embodiment.

The system acquires information on the material 77 and the recipe of the material 77, that is, a cooking method or a processing method from the database. FIG. 12B illustrates an example of the case where the material 77 is cut into thin strips (the material 77 is shredded). The system displays the guideline 75 such that the guideline 75 overlaps a desired position of the material 77 on the display portion 14. For example, the system displays the guideline 75 in a position at a predetermined distance from an end portion of the material 77.

At this time, the number of the guidelines 75 to be displayed is not limited. One guideline 75 may be displayed for every cutting, or a plurality of guidelines 75 that are required for multiple cuttings may be displayed.

As in the above embodiment, as learning of a cutting position of the material 77, a neural network learns teacher data. A neural network used for image generation, such as Autoencoder, CAE, VAE, U-net, or GAN, is preferably used as the neural network.

When an image of the material 77 that is acquired by the system is input to the neural network that has learned, information on the cutting position of the material 77 can be obtained. When image processing is performed on the basis of this information and the guideline 75 is added to the material 77, an image 99 can be obtained.

As described above, one embodiment of the present invention can provide a data processing system capable of acquiring information without using hands. Another embodiment of the present invention can provide a data processing device capable of acquiring information without using hands. Another embodiment of the present invention can provide a data processing method capable of acquiring information without using hands. Another embodiment of the present invention can provide a cooking assistance system capable of acquiring information without using hands. Another embodiment of the present invention can provide a cooking assistance device capable of acquiring information without using hands. Another embodiment of the present invention can provide a cooking assistance method capable of acquiring information without using hands.

The structures, the compositions, the methods, and the like described in this embodiment can be used in an appropriate combination with the structures, the compositions, the methods, and the like described in the other embodiments and examples.

Embodiment 3

In this embodiment, a method for displaying processing time for a cooking device during cooking on the AR glasses 10 is described.

When a material or water is cooked with heat by using a cooking device such as a pan, a frying pan, or a kettle, the heating time varies depending on a cooking detail, the material, and the amount of the material.

While the user performs cooking and processing described in the above embodiment, the system detects the cooking device during cooking with heat and displays heating time and time to terminate cooking with heat in the cooking device on the AR glasses 10. Through object detection by the system, even in the case where cooking with heat is performed using a plurality of cooking devices concurrently, it is possible to display heating time and time to terminate cooking with heat in each cooking device on the AR glasses 10.

Figure 13A:
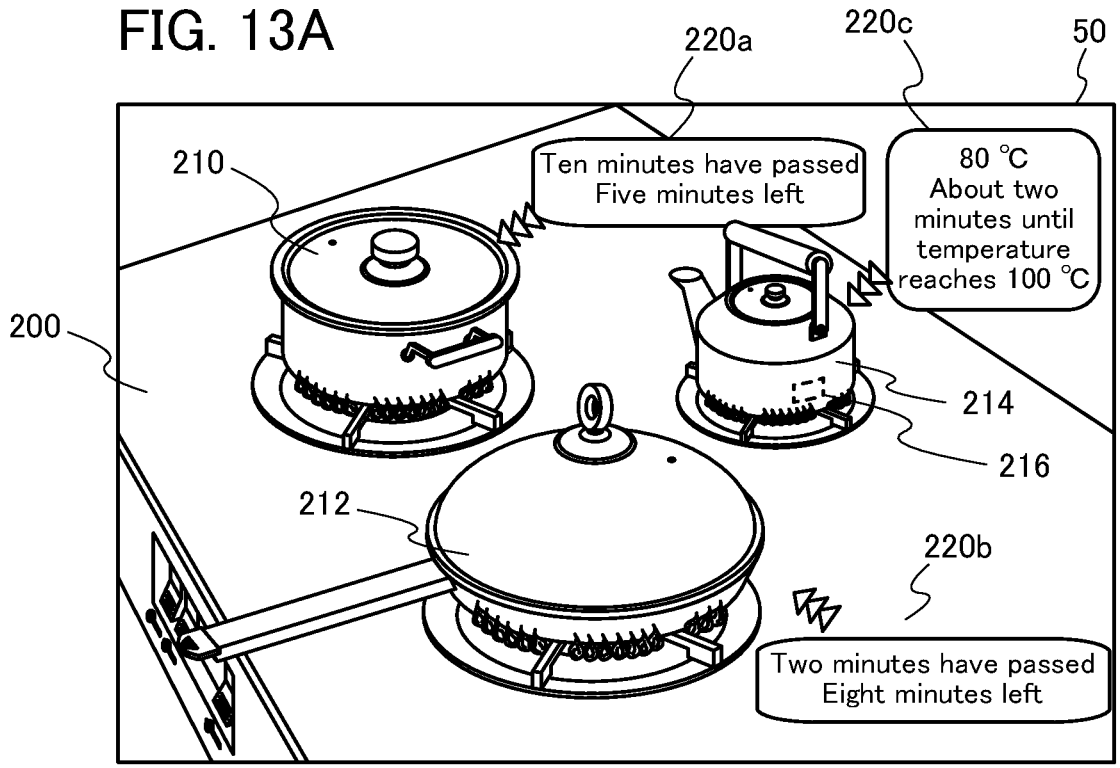
FIG. 13A and FIG. 13B are schematic diagrams illustrating one embodiment of the present invention.

FIG. 13A illustrates the visual field 50 of the user who sees, through the AR glasses 10, a situation where a cooking device 210, a cooking device 212, and a cooking device 214 are placed on a cooking stove 200 including a plurality of heating means and cooking with heat is performed with each heating means. For the heating means included in the cooking stove 200, heating with gas, induction heating (IH), heating with electrical resistance, or the like can be used.

In the heating means, heating intensity can be adjusted. In the heating means that performs heating with gas, heating intensity, that is, thermal power can be adjusted depending on the gas introduction amount. In the heating means that performs induction heating or heating with electrical resistance, heating intensity can be adjusted depending on power to be introduced.

FIG. 13A illustrates an example where a material that needs to be cooked with heat for 15 minutes is heated using the cooking device 210. FIG. 13A illustrates a situation where 10 minutes have passed since the start of cooking with heat. In addition, FIG. 13A illustrates a situation where a text 220a for showing the elapsed time of cooking with heat and the remaining heating time is displayed on the display portion 14 of the AR glasses 10.

Furthermore, FIG. 13A illustrates an example where a material that needs to be cooked with heat for 10 minutes is heated using the cooking device 212. FIG. 13A illustrates a situation where two minutes have passed since the start of cooking with heat. Moreover, FIG. 13A illustrates a situation where a text 220b for showing the elapsed time of cooking with heat and the remaining heating time is displayed on the display portion 14 of the AR glasses 10.

In addition, FIG. 13A illustrates an example where heating is performed using the cooking device 214 until water reaches 100° C. FIG. 13A illustrates a situation where water in the cooking device 214 is heated to 80° C.

Furthermore, a temperature sensor 216 capable of communicating with the AR glasses 10 wirelessly is provided in the cooking device 214. Internal temperature of the cooking device 214 that is sensed by the temperature sensor 216 can be transmitted to the AR glasses 10 and can be displayed on the display portion 14.

The system predicts heating time required for water temperature to reach desired temperature from the amount of water put in the cooking device 214 and the amount of change between water temperature before heating and water temperature after heating. The heating time is preferably predicted by the database. In addition, for prediction of the heating time, machine learning, a datasheet in which energy required for heating a certain amount of water is shown, or the like can be used.

FIG. 13A illustrates a situation where the current water temperature in the cooking device 214 and a result of prediction that the water temperature reaches 100° C. in two minutes are displayed as a text 220c.

Note that although not illustrated in FIG. 13A, the temperature sensor 216 may be provided in the cooking device 210 and the cooking device 212, as in the cooking device 214. When cooking using oil, such as cooking of tempura or fried food, is performed using the cooking device 210 and the cooking device 212, the temperature sensor 216 can acquire oil temperature and transmit the acquired oil temperature to the AR glasses 10. The AR glasses 10 can display internal temperature of each cooking device on the display portion 14.

The user can perform cooking at optimum temperature while checking the internal temperature of the cooking device. In addition, excessive heating of oil in the cooking device might cause heating ignition of oil. When the oil temperature exceeds a certain value, the AR glasses 10 can display warning on the display portion 14 and can alert the user. Furthermore, the AR glasses 10 may be connected to the cooking stove 200 through a network. In that case, it is preferable to stop heating of a desired heated portion by a signal supplied from the AR glasses 10.

In addition, information on the temperature in the cooking device that is acquired from the temperature sensor 216 and a cooking recipe may be analyzed by the database, time required for cooking with heat may be calculated, and the calculated time may be displayed in the texts 220a, 220b, and 220c.

Figure 13B:
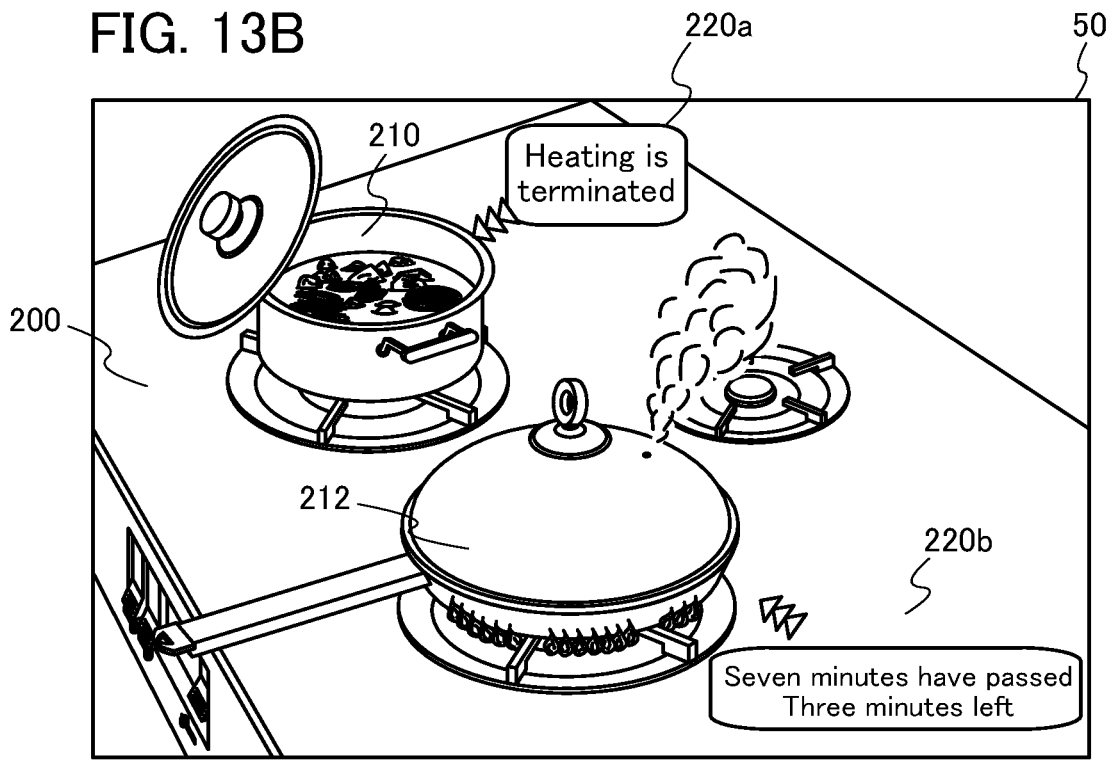

FIG. 13B illustrates the visual field 50 of the user who sees, through the AR glasses 10, appearance on the cooking stove 200 after five minutes have passed since the state in FIG. 13A.

In cooking with heat using the cooking device 210, FIG. 13B illustrates a situation where the heating for predetermined time has been terminated. Termination of the heating time is displayed in the text 220a. After the predetermined heating time is passed, the AR glasses 10 may transmit a signal to the cooking stove 200, and the cooking stove 200 that receives the signal may terminate heating of the cooking device 210.

In cooking with heat using the cooking device 212, FIG. 13B illustrates a situation where seven minutes have passed since the start of cooking with heat. In addition, FIG. 13B illustrates a situation where the elapsed time of cooking with heat and the remaining heating time are updated in the text 220b on the display portion 14 of the AR glasses 10. At this time, the AR glasses 10 may analyze temperature obtained from the temperature sensor 216 provided in the cooking device 212 and may transmit a signal for adjusting heating intensity (thermal power or the like) of the cooking device 212 to the cooking stove 200. For example, in the case where the inside of the cooking device 212 is heated excessively, the AR glasses 10 can transmit a signal for weakening heating to the cooking stove 200. Furthermore, in the case where the internal temperature of the cooking device 212 is low, the AR glasses 10 can transmit a signal for strengthening heating to the cooking stove 200. The cooking stove 200 that receives the signal adjusts the heating intensity of the heated portion.

In FIG. 13B, water heating using the cooking device 214 has already been terminated. FIG. 13B illustrates a situation where the user moves the cooking device 214 from the cooking stove 200. Since the cooking device 214 does not exist in the visual field 50, the text 220c is not displayed on the display portion 14.

The system may terminate heating when water inside the cooking device 214 reaches the desired temperature. In addition, the system may sense movement of the cooking device 214 from the heating means by image processing to be described later and may terminate heating. As to termination of heating, the AR glasses 10 may transmit a heating termination signal to the cooking stove 200 and the cooking stove 200 may receive the signal to terminate heating of a desired heating means.

Figure 14A:
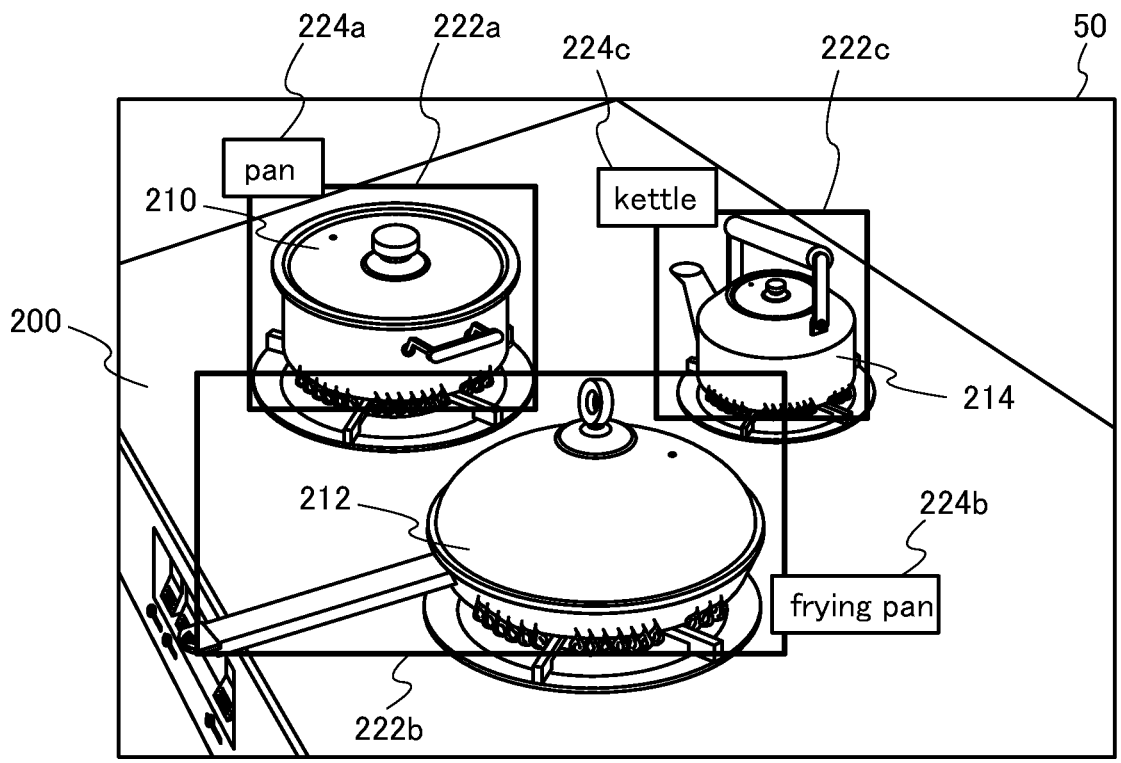
FIG. 14A and FIG. 14B are schematic diagrams illustrating a method for detecting cooking devices according to one embodiment of the present invention.
Figure 14B:
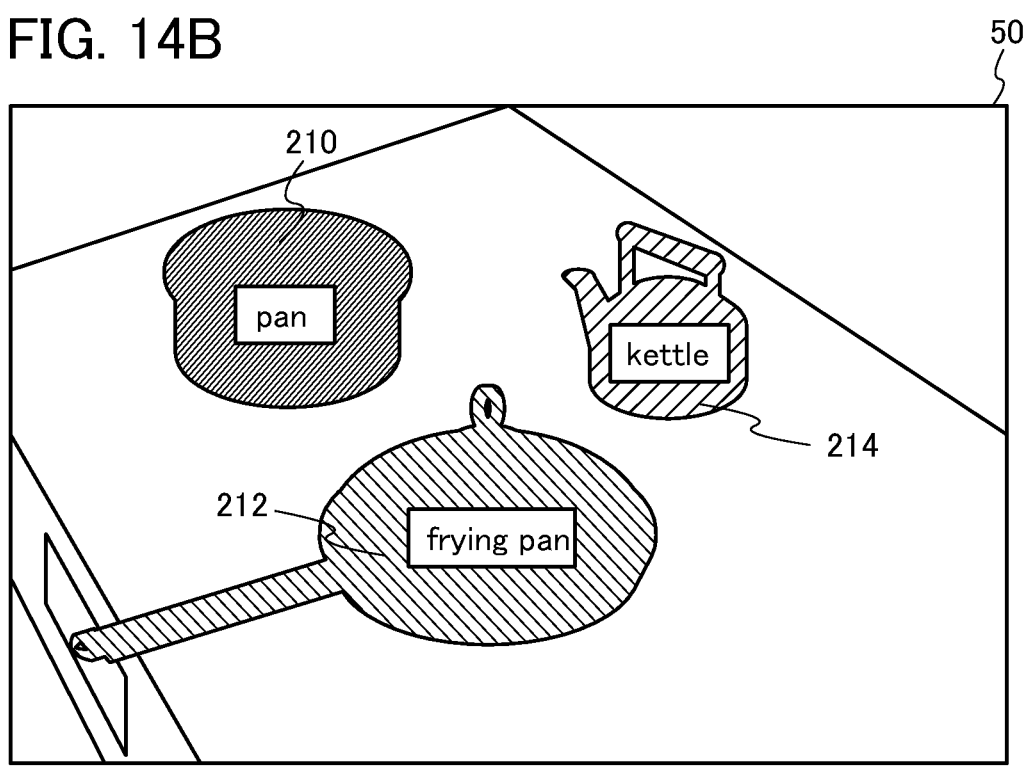

Next, a method for detecting a cooking device such as the cooking device 210, the cooking device 212, or the cooking device 214 is described using FIG. 14A and FIG. 14B. For detection of the cooking device, the object detection method described in Background Art, such as R-CNN, YOLO, or SSD, or semantic segmentation such as FCN, SegNet, U-Net, or PSPNet can be used. The system can perform image analysis of the features of the cooking device, such as the shape and size and can identify the type of the cooking device. Examples of features of the shape include the shape of a handle of or the number of handles of the cooking device, the shape of a spout, and the like. In addition, examples of features of the size include the base area, height, volume, and the like.

FIG. 14A illustrates a situation where a rectangle 222a that surrounds the cooking device 210, a rectangle 222b that surrounds the cooking device 212, and a rectangle 222c that surrounds the cooking device 214 are displayed on the display portion 14. The system judges that the cooking device 210 is a pan through image analysis in the rectangle 222a and displays a text 224a. In addition, the system judges that the cooking device 212 is a frying pan through image analysis in the rectangle 222b and displays a text 224b. Furthermore, the system judges that the cooking device 214 is a kettle through image analysis in the rectangle 222c and displays a text 224c.

The type of each cooking device may be judged by machine learning using teacher data, or a cooking device to be used by the user may be registered in advance in the database or in the memory 16 of the AR glasses 10 to judge the type of each cooking device on the basis of registered data.

In addition, as illustrated in FIG. 14B, each cooking device may be divided into regions. The type of the cooking device may be identified by the shape of each region and a label may be attached to each region. Alternatively, the type of the cooking device may be identified through the image analysis and then a label may be attached to each region.

When the cooking device is detected in the visual field 50 by the above method, the system displays information on the cooking device on the display portion 14. Examples of information displayed on the display portion 14 include the type of the cooking device, a material put in the cooking device, cooking time, and the like. In addition, in the case where no cooking device exists in the visual field 50 by gaze movement of the user or movement of the cooking device, non-display of the information on the cooking device may be performed. Alternatively, after a certain period of time has passed in a state where no cooking device exists in the visual field 50, non-display of the information on the cooking device may be performed.

As described above, one embodiment of the present invention can provide a data processing system capable of acquiring information without using hands. Another embodiment of the present invention can provide a data processing device capable of acquiring information without using hands. Another embodiment of the present invention can provide a data processing method capable of acquiring information without using hands. Another embodiment of the present invention can provide a cooking assistance system capable of acquiring information without using hands. Another embodiment of the present invention can provide a cooking assistance device capable of acquiring information without using hands. Another embodiment of the present invention can provide a cooking assistance method capable of acquiring information without using hands.

The structures, the compositions, the methods, and the like described in this embodiment can be used in an appropriate combination with the structures, the compositions, the methods, and the like described in the other embodiments and examples.

Embodiment 4

In this embodiment, a structure example of an information terminal that can be used for the AR glasses 10 and includes a display device is described.

Figure 15A:
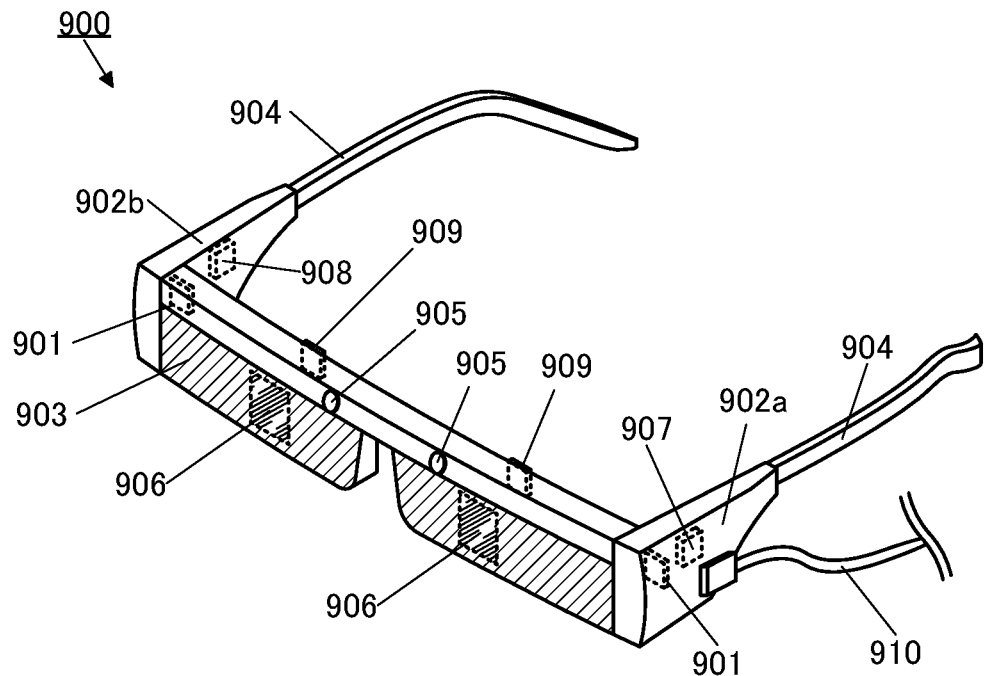
FIG. 15A and FIG. 15B are schematic diagrams illustrating one embodiment of the present invention.

FIG. 15A illustrates a perspective view of a glasses-like information terminal 900. The information terminal 900 includes a pair of display panels 901, a pair of housings (a housing 902*a* and a housing 902*b*), a pair of optical members 903, a pair of mounting portions 904, and the like.

The information terminal 900 can project an image displayed on the display panel 901 onto a display region 906 of the optical member 903. In addition, since the optical members 903 have light-transmitting properties, the user can see images displayed on the display regions 906 that are superimposed on transmission images seen through the optical members 903. Thus, the information terminal 900 is an information terminal capable of performing AR display. Note that not only the display panel 901 but also the optical members 903 including the display regions 906 and an optical system including a lens 911, a reflective plate 912, and a reflective plane 913 to be described later can be included in the display portion 14 described in the above embodiment. An organic EL display, an LED display, an inorganic EL display, a liquid crystal display, or the like can be used as the display panel 901. Note that in the case where a liquid crystal display is used as the display panel 901, a light source that functions as a backlight is preferably provided.

In addition, a pair of cameras 905 capable of taking front images and a pair of cameras 909 capable of taking images on the user side are provided in the information terminal 900. The camera 905 is part of components of the first camera module 11, and the camera 909 is part of components of the second camera module 12. A plurality of cameras 905 are preferably provided in the information terminal 900 because three-dimensional images of a material or a cooking device can be taken. However, the cameras 905 in this embodiment are not limited thereto. One camera 905 may be provided in the information terminal 900. In that case, the camera 905 may be provided in a center portion of a front of the information terminal 900 or may be provided in a front of one of the housing 902*a* and the housing 902*b*. Furthermore, two cameras 905 may be provided in fronts of the housing 902*a* and the housing 902*b*.

The camera 909 can sense the user's gaze. Thus, two cameras 909 for a right eye and for a left eye are preferably provided. Note that in the case where one camera can sense the gaze of both eyes, one camera 909 may be provided. In addition, the camera 909 may be an infrared camera capable of detecting infrared rays.

In addition, the housing 902*a* includes a wireless communication device 907, and a video signal or the like can be supplied to a housing 902. Furthermore, the wireless communication device 907 preferably includes the communication module 17 and communicates with a database.

Note that instead of the wireless communication device 907 or in addition to the wireless communication device 907, a connector that can be connected to a cable 910 for supplying a video signal or a power supply potential may be provided. The cable 910 may have a function of the wiring 10*c* that is connected to the housing 10*b*. Furthermore, when the housing 902 is provided with an acceleration sensor, a gyroscope sensor, or the like as the sensor 25, the orientation of the user's head can be sensed and an image corresponding to the orientation can also be displayed on the display region 906. Moreover, the housing 902 is preferably provided with the battery 21, in which case charging can be performed with or without a wire.

Furthermore, the housing 902*b* is provided with an integrated circuit 908. The integrated circuit 908 includes the controller 13, the processor 15, the memory 16, the audio controller 18, and the like and has a function of controlling a variety of components included in the information terminal 900, such as the camera 905, the wireless communication device 907, the pair of display panels 901, the microphone 19, and the speaker 20, a function of generating images, and the like. The integrated circuit 908 may have a function of generating synthesized images for AR display.

Data communication with an external device can be performed by the wireless communication device 907. For example, when data transmitted from the outside is output to the integrated circuit 908, the integrated circuit 908 can generate image data for AR display on the basis of the data. Examples of the data transmitted from the outside include data including information required for cooking that is transmitted from the database, data including information on cooking that is transmitted from a variety of sensors or the like provided in the cooking device, and the like.

Figure 15B:
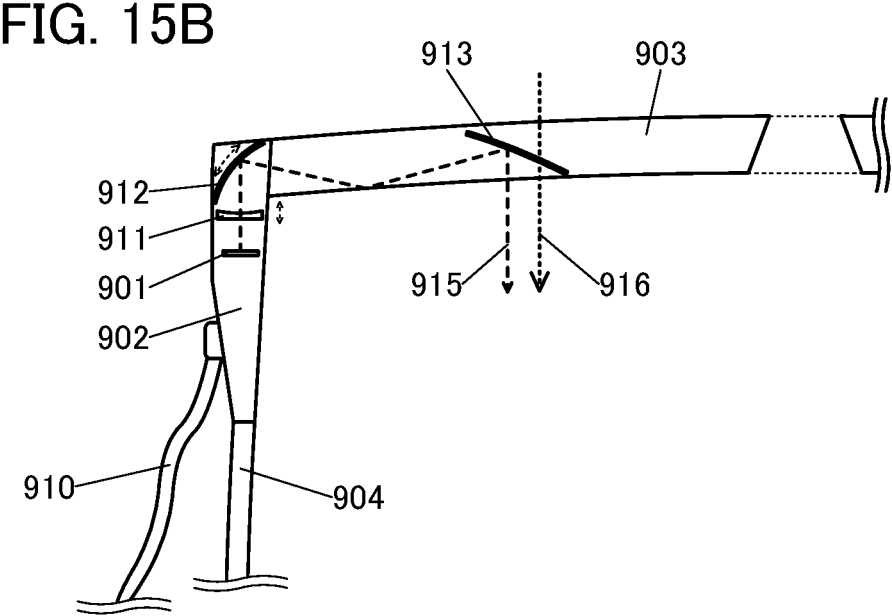

Next, a method for projecting an image on the display region 906 of the information terminal 900 is described using FIG. 15B. The display panel 901, the lens 911, and the reflective plate 912 are provided in the housing 902. In addition, the reflective plane 913 functioning as a half mirror is provided in a portion corresponding to the display region 906 of the optical member 903.

Light 915 emitted from the display panel 901 passes through the lens 911 and is reflected by the reflective plate 912 to the optical member 903 side. In the optical member 903, the light 915 is fully reflected repeatedly by end surfaces of the optical member 903 and reaches the reflective plane 913, so that an image is projected on the reflective plane 913. Accordingly, the user can see both the light 915 reflected by the reflective plane 913 and transmitted light 916 that has passed through the optical member 903 (including the reflective plane 913). Note that in the case where a liquid crystal display is used as the display panel 901, a light source that functions as a backlight is preferably provided such that light from the light source passes through the display panel 901 and enters the lens 911. In other words, a liquid crystal panel of the liquid crystal display is preferably provided between the light source and the lens 911.

FIG. 15B illustrates an example in which the reflective plate 912 and the reflective plane 913 each have a curved surface. This can increase optical design flexibility and reduce the thickness of the optical member 903, compared to the case where they have flat surfaces. Note that the reflective plate 912 and the reflective plane 913 may have flat surfaces.

A component having a mirror surface can be used for the reflective plate 912, and the reflective plate 912 preferably has high reflectance. In addition, as the reflective plane 913, a half mirror utilizing reflection of a metal film may be used, but the use of a prism utilizing total reflection or the like can increase the transmittance of the transmitted light 916.

Here, the housing 902 preferably includes a mechanism for adjusting the distance and angle between the lens 911 and the display panel 901. This enables focus adjustment, zooming in/out of an image, or the like. One or both of the lens 911 and the display panel 901 are configured to be movable in the optical-axis direction, for example.

In addition, the housing 902 preferably includes a mechanism capable of adjusting the angle of the reflective plate 912. The position of the display region 906 where images are displayed can be changed by changing the angle of the reflective plate 912. Thus, the display region 906 can be placed at an optimal position in accordance with the position of the user's eye.

The display device of one embodiment of the present invention can be used for the display panel 901. Thus, the information terminal 900 can perform display with extremely high resolution.

REFERENCE NUMERALS

10: AR glasses, 10a: glass portion, 10b: housing, 10c: wiring, 11: camera module, 12: camera module, 13: controller, 14: display portion, 15: processor, 16: memory, 17: communication module, 18: audio controller, 19: microphone, 20: speaker, 21: battery, 22: bus, 23: server, 25: sensor, 26: computer, 27: computer, 28: computer, 29: smartphone, 50: visual field, 51: pointer, 60: cutting board, 61a: marker, 61b: marker, 61c: marker, 61d: marker, 62: material, 63: kitchen knife, 64: dishcloth, 65: rectangle, 70: menu, 71: recipe, 72: text, 73: text, 75: guideline, 76: material, 77: material, 78: bone, 80: data set, 81: image set, 82: image set, 83: starting point, 84: end point, 85: neural network, 86: image, 87: image, 88: starting point, 89: end point, 90: image, 91: image set, 92: image set, 95: neural network, 96: image, 97: image, 98: image, 99: image, 100: data set, 200: cooking stove, 210: cooking device, 212: cooking device, 214: cooking device, 216: temperature sensor, 220a: text, 220b: text, 220c: text, 222a: rectangle, 222b: rectangle, 222c: rectangle, 224a: text, 224b: text, 224c: text, 900: information terminal, 901: display panel, 902: housing, 902a: housing, 902b: housing, 903: optical member, 904: mounting portion, 905: camera, 906: display region, 907: wireless communication device, 908: integrated circuit, 909: camera, 910: cable, 911: lens, 912: reflective plate, 913: reflective plane, 915: light, and 916: transmitted light.

The invention claimed is:

1. A data processing system comprising:
a wearable device including a display means and an imaging means;
a database connected to the wearable device through a network; and
a camera module configured to capture movement of an eye of an user and to detect a gaze of the user,
wherein the database includes at least one of pieces of information on a cooking recipe, a cooking method, and a material,
wherein the wearable device detects a first material by the imaging means,
wherein the wearable device collects information on the first material from the database,
wherein when the first material exists in a specific region in an imaging range of the imaging means, the information on the first material is displayed on the display means,
wherein when the first material does not exist in the specific region, the information on the first material is not displayed on the display means, and
wherein the camera module is configured to analyze positional relationship between an inner corner of the eye of the user and an iris from an image of the eye of the user,
wherein the display means is configured to display the cooking method on the display means, and
wherein the display means is configured to display a cutting position of the first material on the display means so that the cutting position overlaps the first material on the user's gaze.

2. The data processing system according to claim 1, wherein a cooking method using the first material is displayed on the display means based on the cooking recipe.

3. The data processing system according to claim 1, wherein the information on the first material contains the cutting position of the first material.

4. The data processing system according to claim 1, wherein the information on the first material contains a position of a bone included in the first material.

5. The data processing system according to claim 1, wherein the wearable device is a glasses-like wearable device.

6. A data processing method using a wearable device, wherein the wearable device includes a display means and an imaging means, and wherein the data processing method includes a step of detecting a cutting board existing on a user's gaze by using the imaging means, a step of identifying a first material on the cutting board, a step of displaying a cooking method on the display means, and a step of displaying a cutting position of the first material on the display means so that the cutting position overlaps the first material on the user's gaze.

7. The data processing method according to claim 6, further comprising a step of displaying a position of a foreign matter existing on a surface of the material or inside the material so that the position overlaps the material on the user's gaze.

8. The data processing method according to claim 7, wherein the foreign matter is one selected from a bone, a scale, a parasite, and a hair.

9. The data processing system according to claim 6, wherein the wearable device is a glasses-like wearable device.

* * * * *